United States Patent
Lin

(10) Patent No.: US 12,379,751 B2
(45) Date of Patent: Aug. 5, 2025

(54) SYNCHRONIZING HINGE

(71) Applicant: FOSITEK CORPORATION, New Taipei (TW)

(72) Inventor: Chun-Han Lin, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 251 days.

(21) Appl. No.: 18/364,313

(22) Filed: Aug. 2, 2023

(65) Prior Publication Data
US 2024/0393840 A1 Nov. 28, 2024

(30) Foreign Application Priority Data
May 26, 2023 (TW) ................... 112119644

(51) Int. Cl.
*G06F 1/16* (2006.01)
(52) U.S. Cl.
CPC .......... *G06F 1/1681* (2013.01); *G06F 1/1616* (2013.01); *G06F 1/1652* (2013.01)
(58) Field of Classification Search
CPC .... G06F 1/1616; G06F 1/1652; G06F 1/1681; H04M 1/022
See application file for complete search history.

(56) References Cited

U.S. PATENT DOCUMENTS

2024/0056517 A1* 2/2024 Cheng ................ H04M 1/022
2024/0427388 A1* 12/2024 Shen ................... H04M 1/022

* cited by examiner

*Primary Examiner* — Anthony Q Edwards
(74) *Attorney, Agent, or Firm* — Birch, Stewart, Kolasch & Birch, LLP

(57) ABSTRACT

A synchronizing hinge includes a rotating module and a bracket plate unit. The rotating module includes two support units pivotably mounted to a base seat. Each support unit has a first support piece, a second support piece pivotably connected with the first support piece, and a moving axle extending through the first support piece and an arcuate slot of the second support piece and movably received in a moving slot of the base seat. The bracket plate unit includes two first bracket plates securely connected with the first support piece, and two second bracket plates securely connected with the second support piece. The support units and the bracket plate unit are rotatable between an initial position where the first bracket plates are flush with the second bracket plates, and a terminal position where the first bracket plates are inclined relative to the second bracket plates by an inclined angle.

7 Claims, 24 Drawing Sheets

SYNCHRONIZING HINGE

CROSS-REFERENCE TO RELATED APPLICATION

This application claims priority to Taiwanese Patent Application No. 112119644, filed on May 26, 2023.

FIELD

The disclosure relates to a hinge, and more particularly to a synchronizing hinge.

BACKGROUND

In recent years, flexible displays have been widely used for a variety of foldable electronic devices. These flexible displays have an infolding structure and an outfolding structure. In the infolding structure, a hinge is disposed to generate an appropriate leeway for accommodating a bending portion of a flexible display and to prevent damage to the flexible display when the foldable electronic device is in a folded state. For this design, a clearance between two device parts becomes larger when the foldable electronic device is in an unfolded state, which results in increased thickness of the foldable electronic device and makes the outer appearance of the device unattractive.

SUMMARY

Therefore, an object of the disclosure is to provide a synchronizing hinge that can alleviate at least one of the drawbacks of the prior art.

According to the disclosure, the synchronizing hinge is adapted to be disposed between two housing bodies of a foldable electronic device to support a flexible display. The synchronizing hinge includes at least one rotating module and a bracket plate unit. The rotating module includes a base seat and two support units which are pivotably mounted to the base seat. The base seat has two moving slots, each of which has a moving proximal end and a moving distal end. Each of the support units has a first support piece, a second support piece which is pivotably connected with the first support piece, and a moving axle which extends through the first support piece and the second support piece and which is movably received in a respective one of the moving slots. The second support piece has an arcuate slot which has an arcuate proximal end and an arcuate distal end. The moving axle extends through the arcuate slot. The bracket plate unit includes two first bracket plates and two second bracket plates. Each of the first bracket plates is securely connected with the first support piece of a respective one of the support units, and has a first plate surface for attachment of the flexible display. The first bracket plates are interposed between the second bracket plates. Each of the second bracket plates is securely connected with the second support piece of the respective one of the support units, and has a second plate surface for attachment of the flexible display. The support units and the bracket plate unit are rotatable between an initial position and a terminal position to shift the two housing bodies between a spread out state corresponding to the initial position to spread out the flexible display and a folded state corresponding to the terminal position to fold in the flexible display. In the initial position, the moving axles are disposed at the moving proximal ends of the moving slots and the arcuate distal ends of the arcuate slots, and the first plate surfaces of the first bracket plates are flush with the second plate surfaces of the second bracket plates so as to keep the flexible display in a flat state. In the terminal position, the moving axles are disposed at the moving distal ends of the moving slots and the arcuate proximal ends of the arcuate slots, and the first bracket plates abut against the base seat and are rotated to be respectively inclined relative to the second bracket plates by an inclined angle. The moving axles are separated from each other by a distance when the support units and the bracket plate unit are in the terminal position, which is larger than that when the support units and the bracket plate unit are in the initial position.

With the first bracket plates inclined relative to the second bracket plates by an inclined angle, a leeway space is produced therebetween for accommodating a bending portion of the flexible display so as to not interfere with the base seat. Also, with the first support pieces securely connected with the first bracket plates and rotated with the moving axles and the second support pieces, the first bracket plates are moved along with the first support pieces while being restrained by the first support pieces so as to prevent excess angular movement of the first bracket plates relative to the second bracket plates to avoid bulging up of the flexible display.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
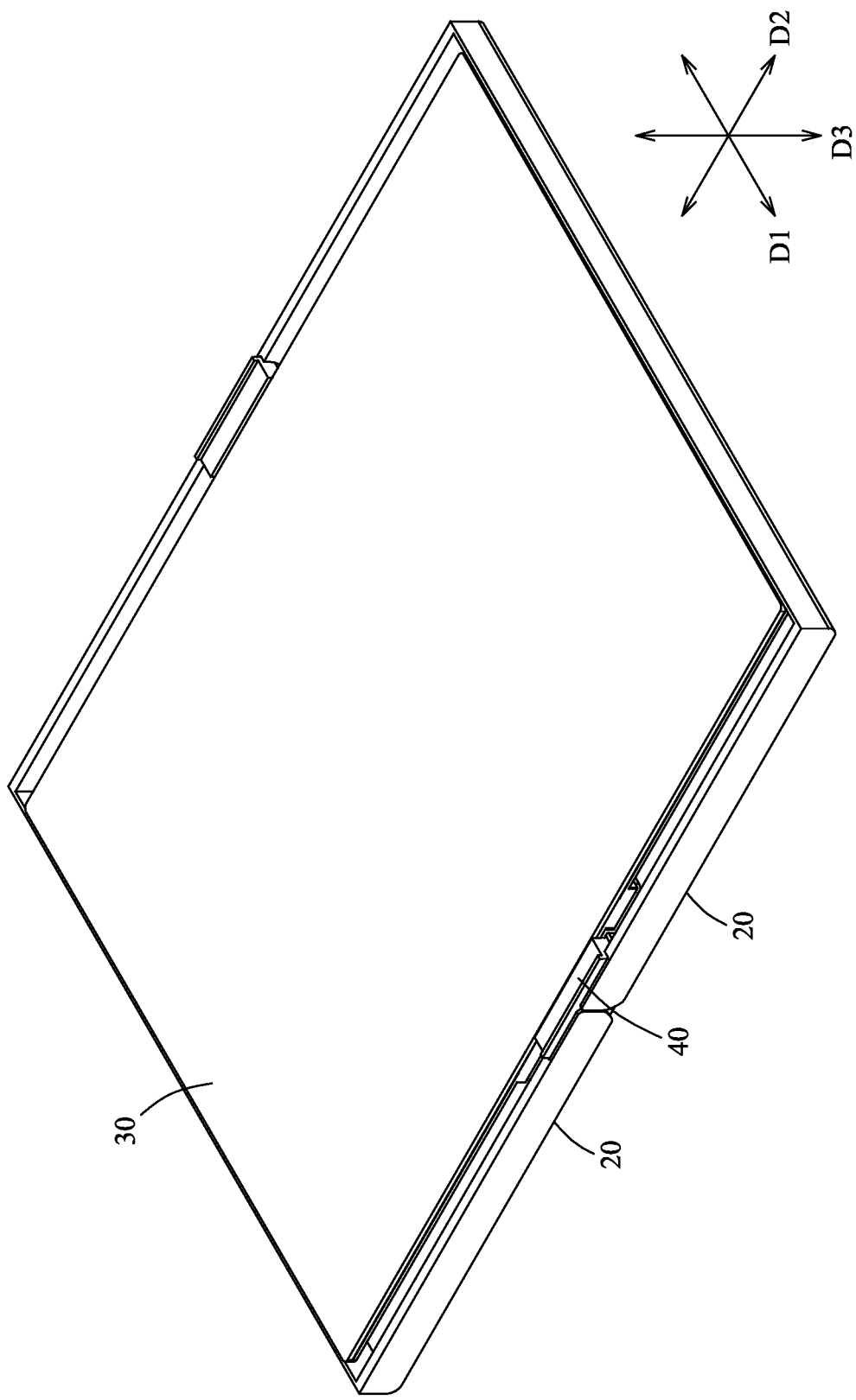
FIG. 1 is a perspective view illustrating an embodiment of a synchronizing hinge according to the disclosure mounted on a flexible electronic device in a spread out state.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
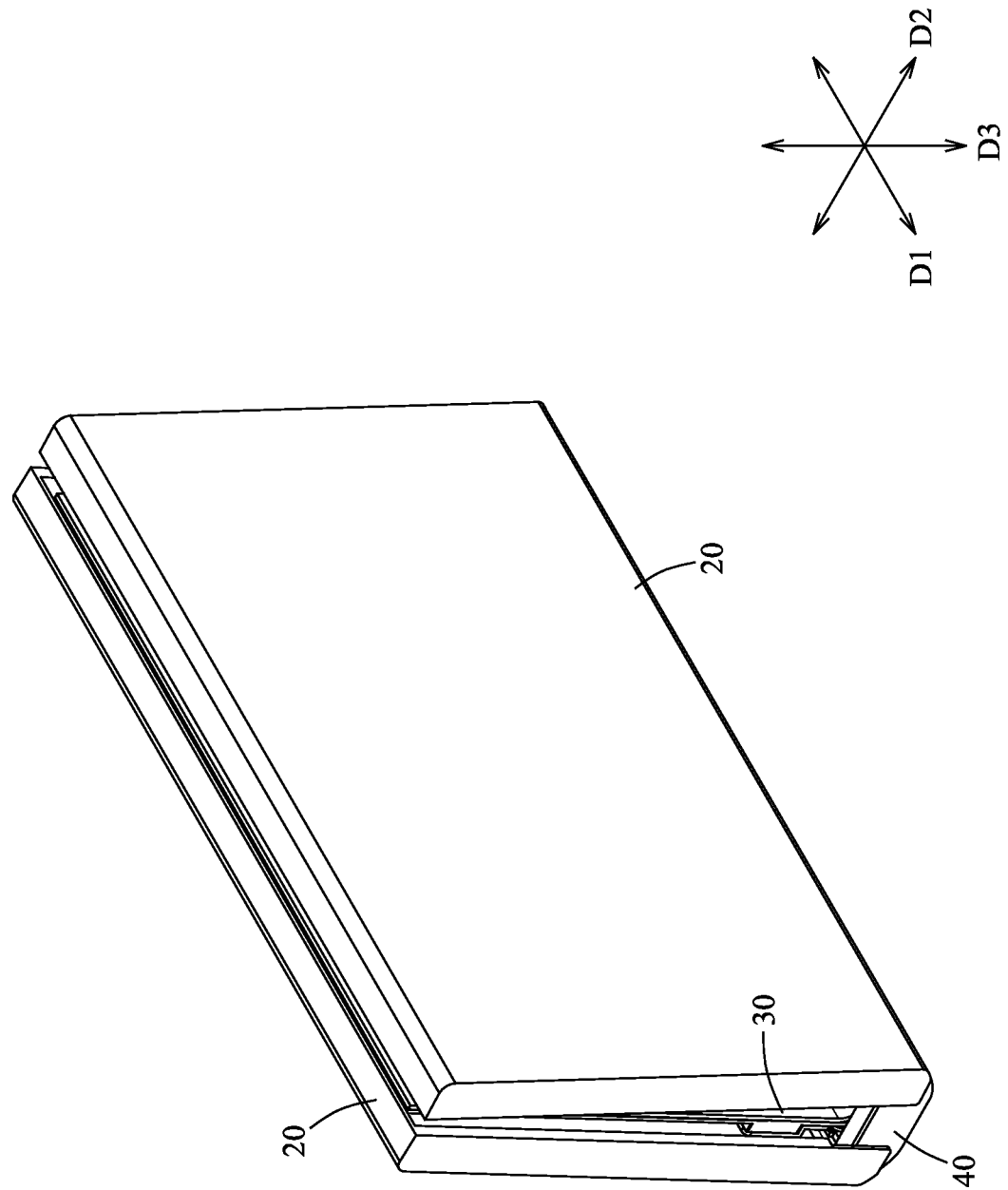
FIG. 2 is a perspective view similar to FIG. 1, illustrating that the flexible electronic device is in a folded state.
Figure 3:
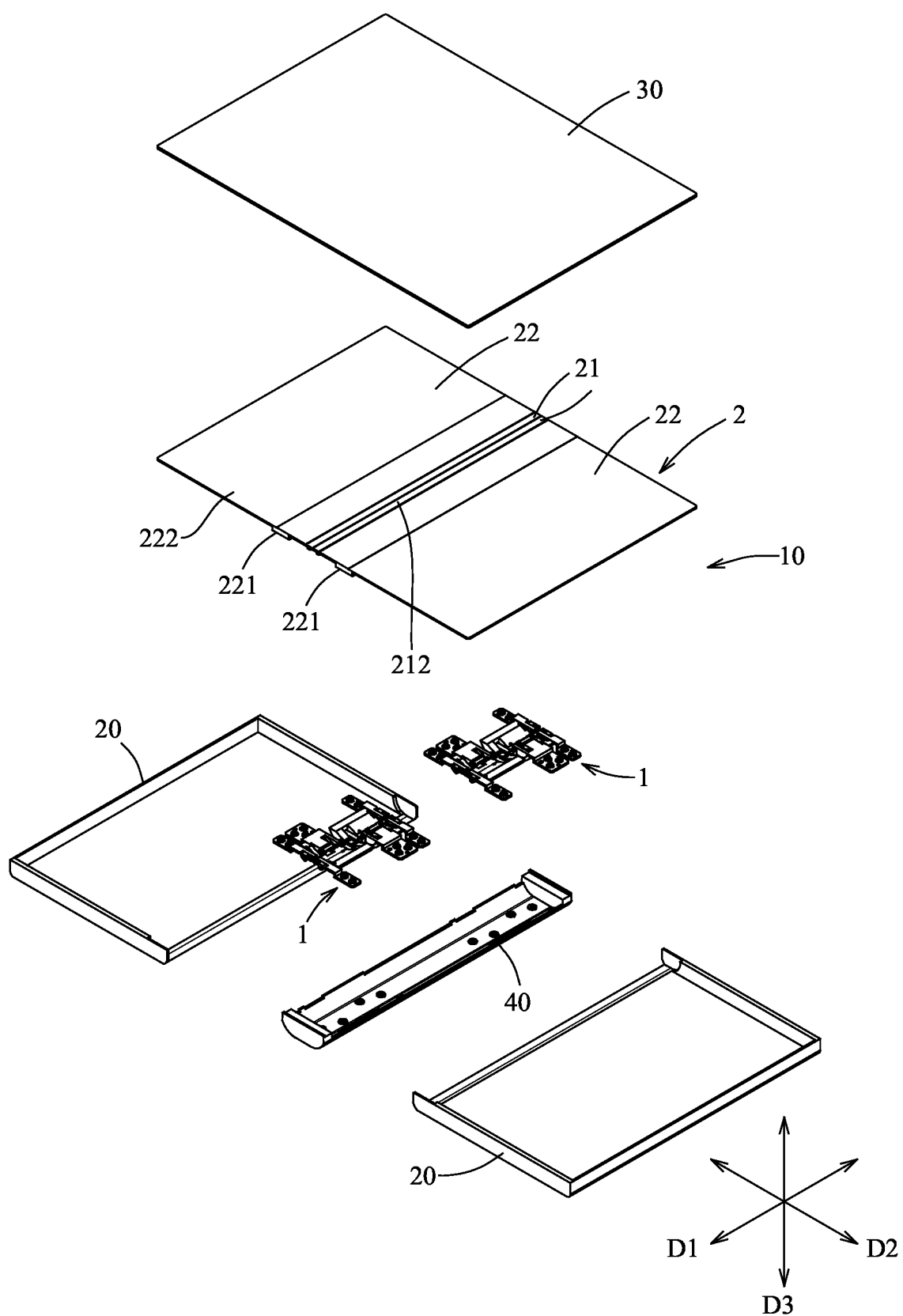
FIG. 3 is an exploded perspective view of FIG. 1.

Referring to FIGS. 1 to 3, an embodiment of a synchronizing hinge 10 according to the disclosure is adapted to be disposed among two housing bodies 20 and a central housing 40 of a foldable electronic device to support a flexible display 30 such that the housing bodies 20 are shiftable between a usable state and a folded state. In the usable state, the housing bodies 20 are spread out and parallel to each other. In the folded state, the housing bodies 20 are superimposed upon each other. The synchronizing hinge 10 includes two rotating modules 1 and a bracket plate unit 2.

Figure 4:
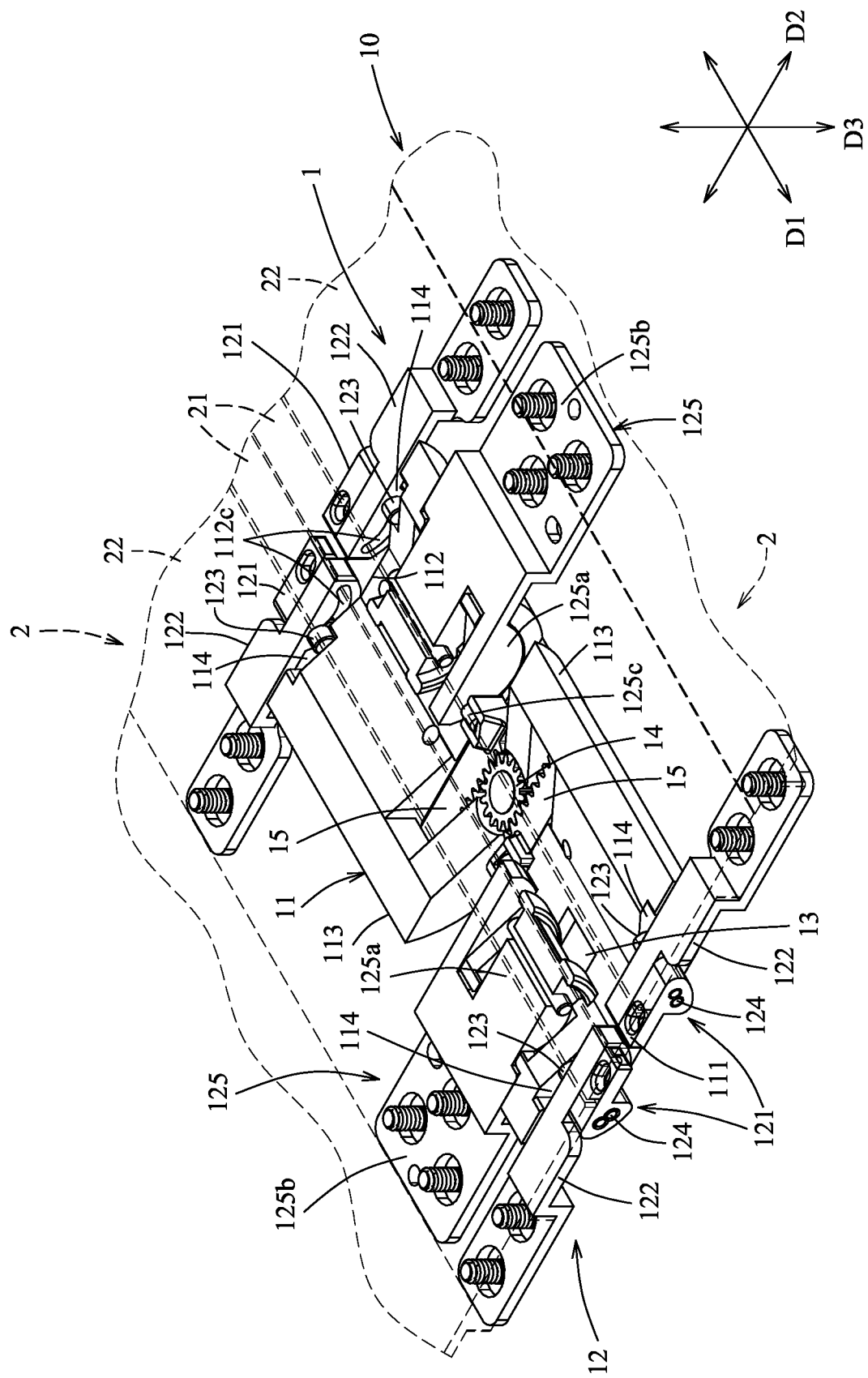
FIG. 4 is a fragmentary perspective view of the embodiment.
Figure 5:
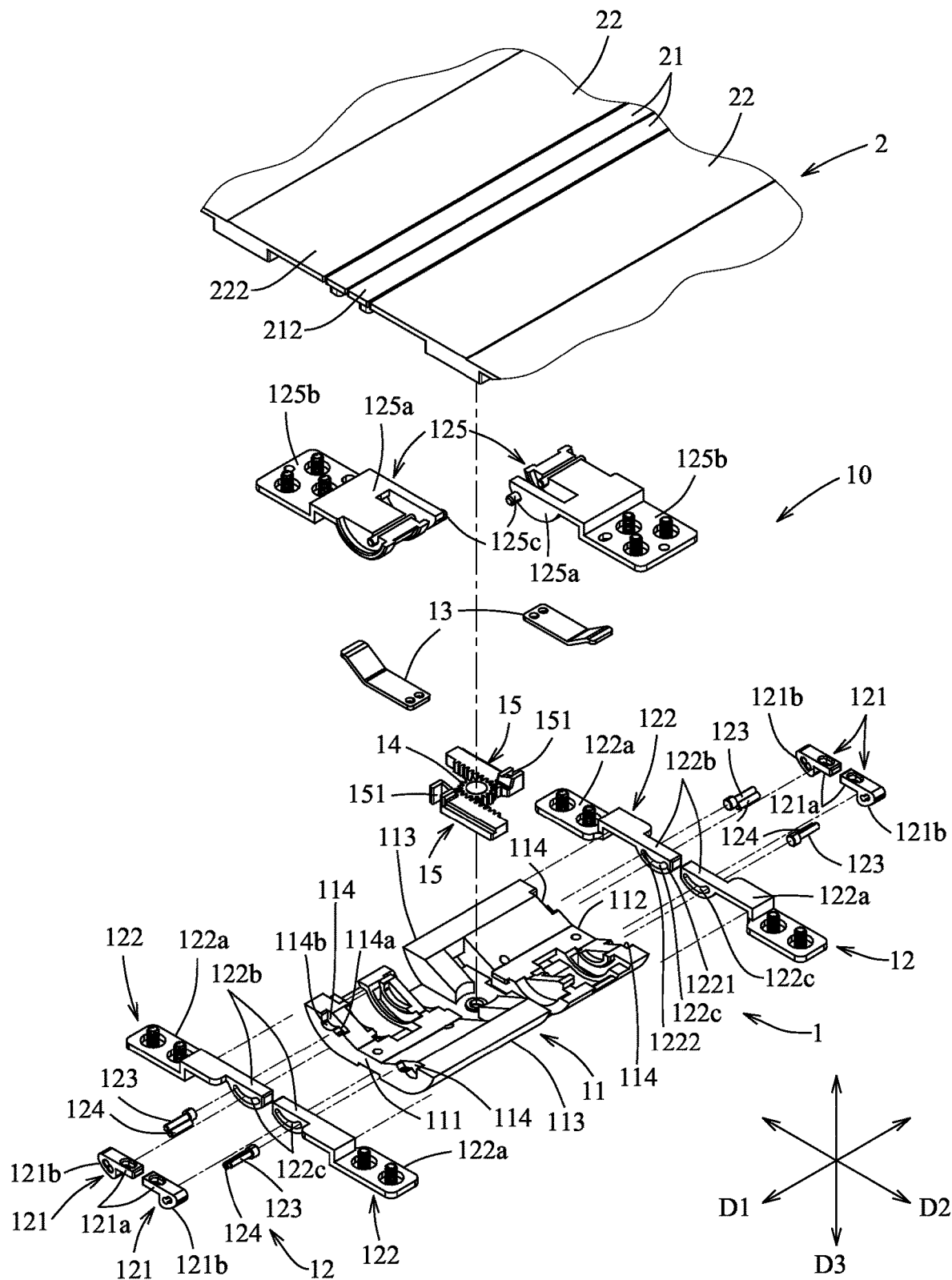
FIG. 5 is a fragmentary, exploded perspective view of the embodiment.
Figure 6:
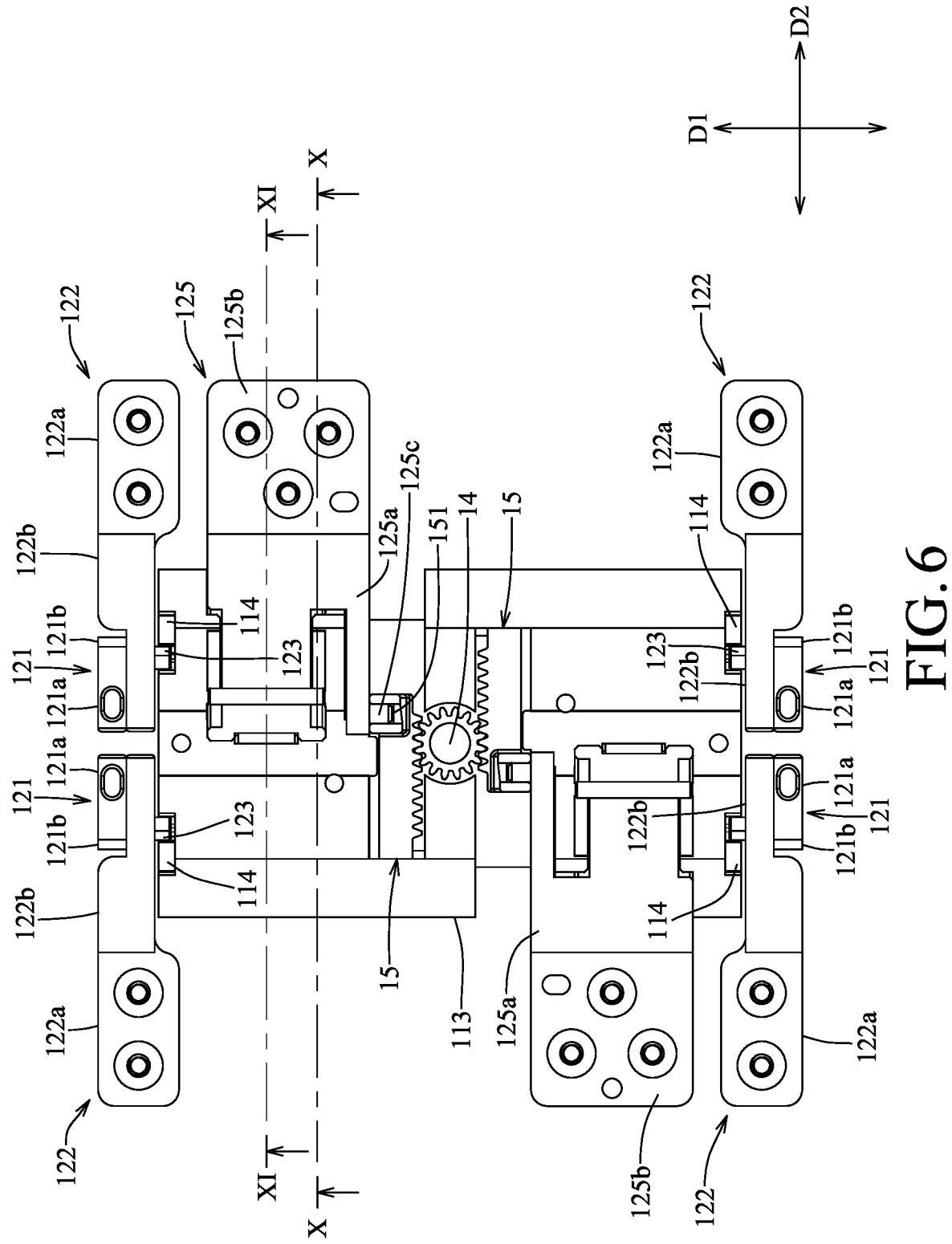
FIG. 6 is a top view of a rotating module of the embodiment.
Figure 7:
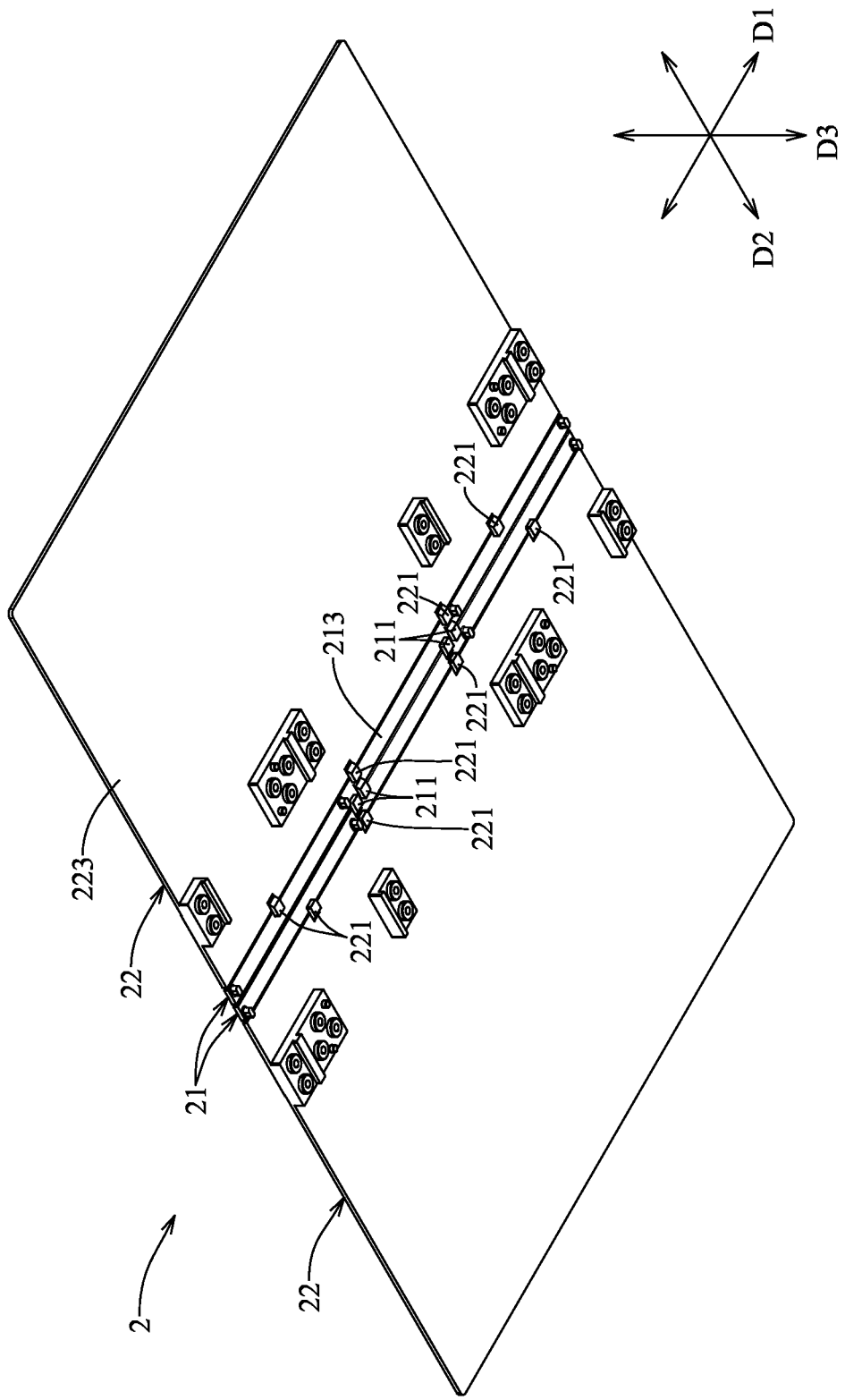
FIG. 7 is a perspective view of a bracket plate unit of the embodiment.
Figure 8:
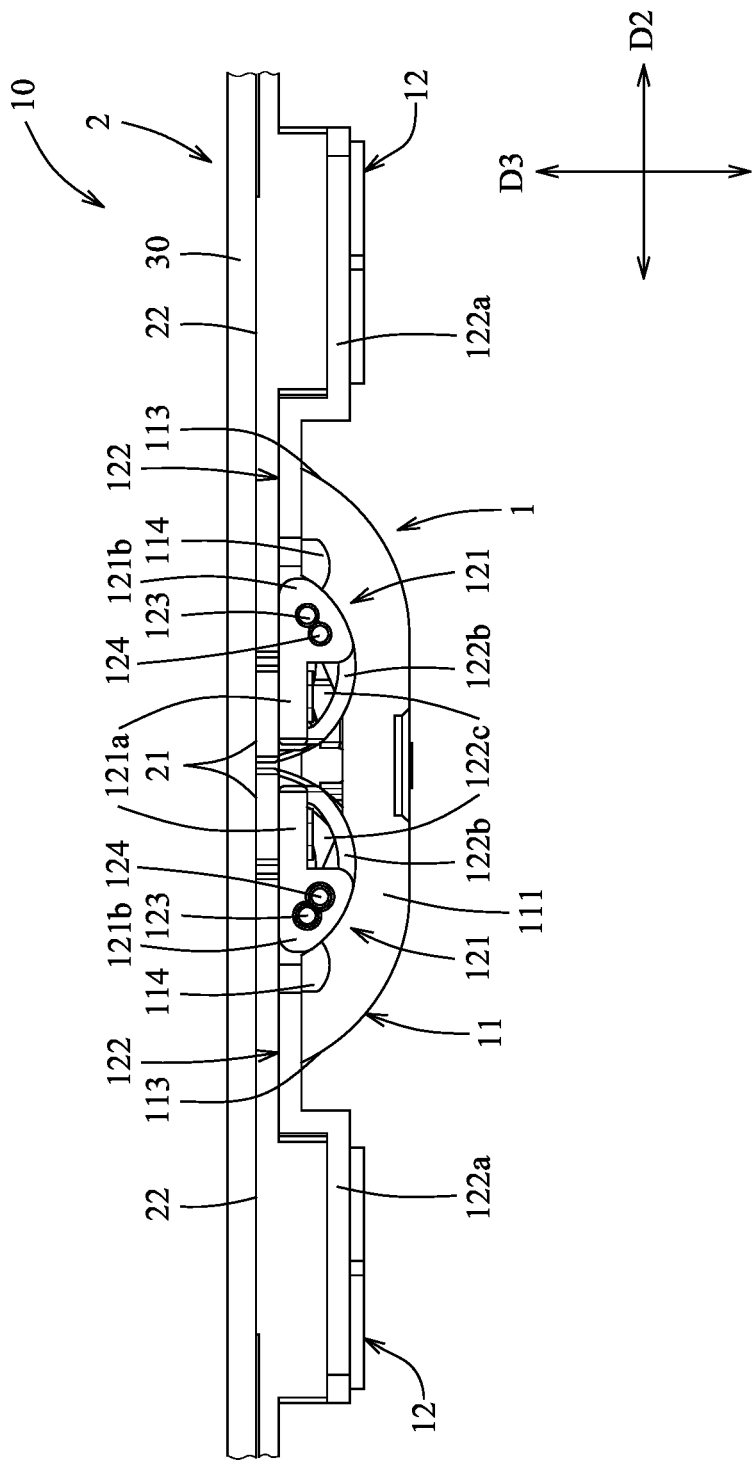
FIG. 8 is a fragmentary front view of the embodiment, illustrating two support units of the rotating module and the bracket plate unit in an initial position.
Figure 9:
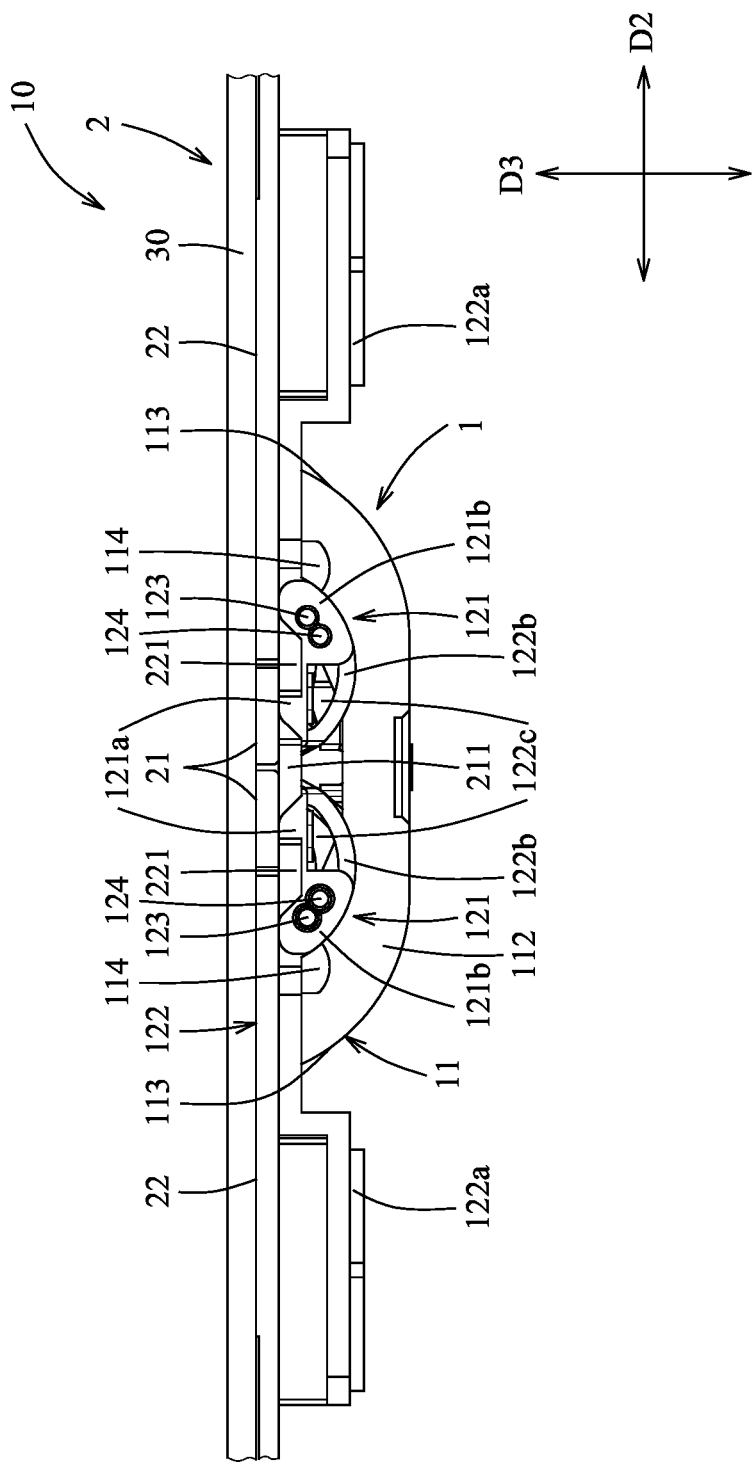
FIG. 9 is a fragmentary rear view of the embodiment, illustrating the support units and the bracket plate unit in the initial position.
Figure 10:
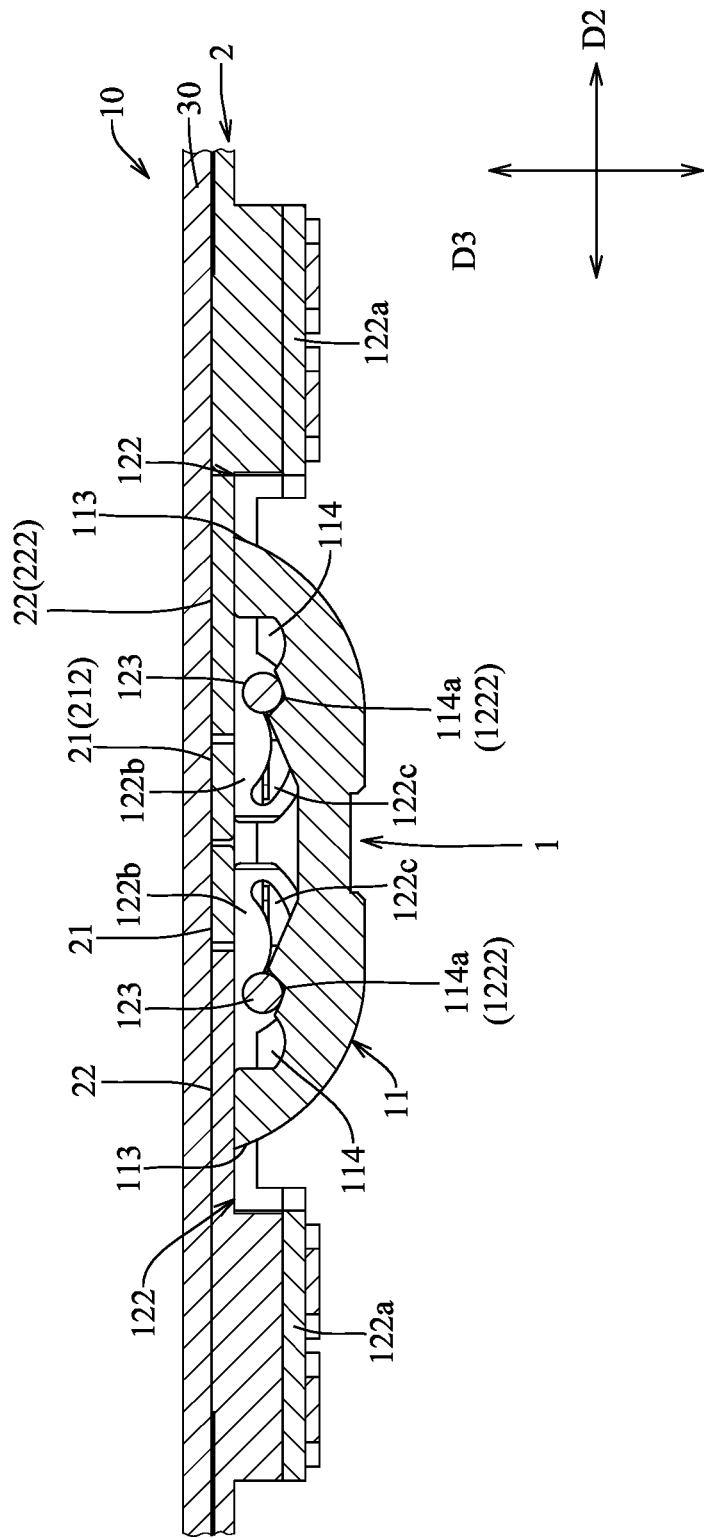
FIG. 10 is a fragmentary sectional view taken along line X-X of FIG. 6.

With reference to FIGS. 4 to 6, each rotating module 1 includes a base seat 11, two support units 12 which are pivotably mounted to the base seat 11, two torsion pieces 13 which are securely disposed on the base seat 11, a pinion 14 which is rotatably disposed on the base seat 11, and two racks 15 which are movably disposed on the base seat 11. The base seat 11 is a generally arcuate and elongated plate, and extends in a front-rear direction (D1). The base seat 11 has a first end 111, a second end 112 opposite to the first end 111 in the front-rear direction (D1), two lateral sides 113 interconnecting the first and second ends 111, 112 and being opposite to each other in a left-right direction (D2), and two pairs of moving slots 114. The moving slots 114 of each pair are disposed opposite to each other in the left-right direction (D2). Each moving slot 114 extends in the left-right direction (D2) to have a moving proximal end (114a) and a moving distal end (114b). The moving proximal ends (114a) of the moving slots 114 of each pair are proximate to each other, and the moving distal ends (114b) are distal from each other in the left-right direction (D2).

Each of the support units 12 has two first support pieces 121, two second support pieces 122 which are respectively and pivotably connected with the first support pieces 121, two moving axles 123 which respectively extend through the first support pieces 121 and the second support pieces 122 and which are respectively and movably received in the moving slots 114, two connecting shafts 124 which respectively extend through the first support pieces 121 and the second support pieces 122, and a rotating plate 125 which is rotatably disposed on the base seat 11. Each first support piece 121 has a first support portion (121a) and a first pivoting portion (121b) which extends from the first support portion (121a) toward a corresponding lateral side 113. Each second support piece 122 has a second support portion (122a), a second pivoting portion (122b) which extends from the second pivoting portion (122a) and which is disposed at a side of the first pivoting portion (121b), and an arcuate slot (122c) which is formed in the second pivoting portion (122b). The arcuate slot (122c) has an arcuate proximal end 1221 and an arcuate distal end 1222. The arcuate proximal ends 1221 of the two second support pieces 122 are proximate to each other, and the arcuate distal ends 1222 are distal from each other in the left-right direction (D2). Each moving axle 123 extends in the front-rear direction (D1) through the first pivoting portion (121b) of the corresponding first support piece 121 and the corresponding arcuate slot (122c) and is inserted into the corresponding moving slot 114. Each connecting shaft 124 extends in the front-rear direction (D1) only through the first pivoting portion (121b) and the arcuate slot (122c), and is in an abutting engagement with the corresponding moving axle 123 so as to be movable with the moving axle 123 in the corresponding arcuate slot (122c).

Figure 11:
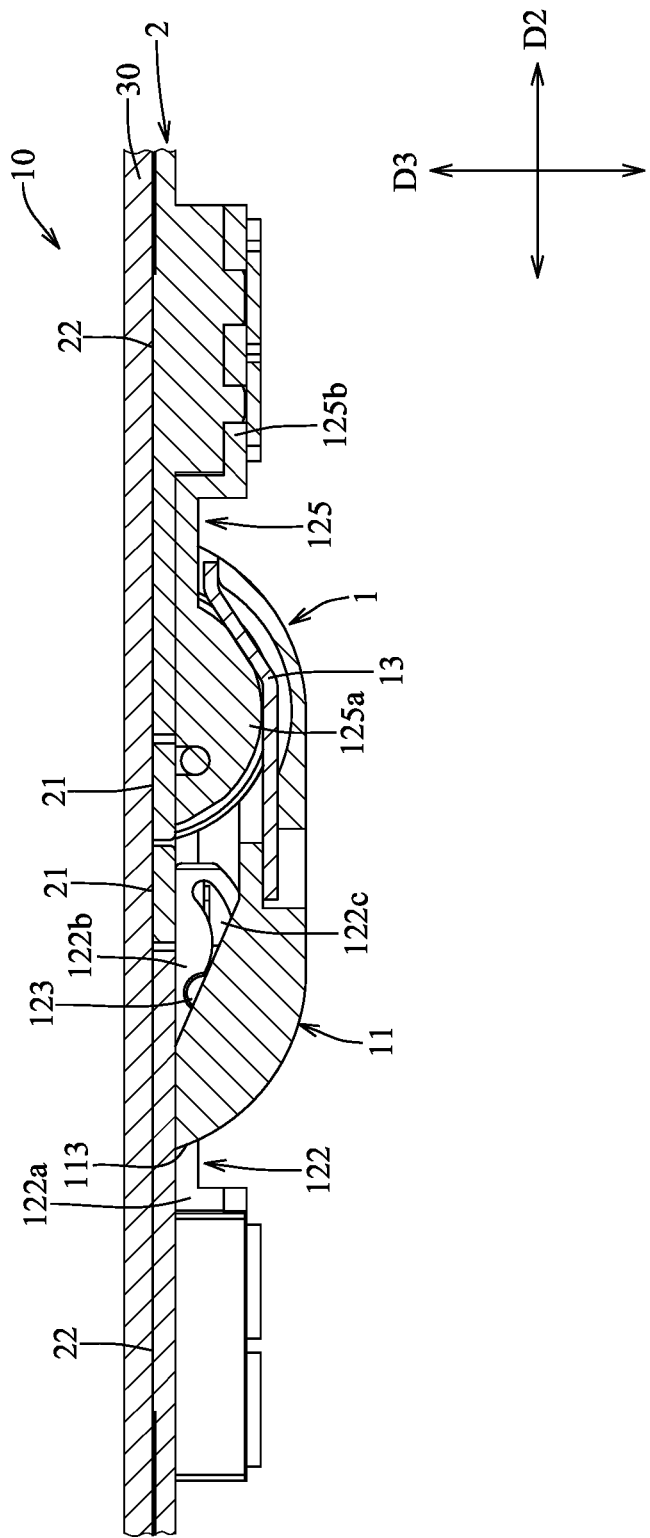
FIG. 11 is a fragmentary sectional view taken along line XI-XI of FIG. 6.

The two rotating plates 125 respectively project from the lateral sides 113 of the base seat 11, and are respectively disposed adjacent to the first and second ends 111, 112. The rotating plates 125 are arranged symmetrically in relation to the pinion 14. Each rotating plate 125 has an arcuate-shaped rotating portion (125a) which is rotatably disposed on the base seat 11, a flat plate portion (125b) which extends from the rotating portion (125a) in the left-right direction (D2), and a stud (125c) which is formed on the rotating portion (125a) and which is movably engaged in a connecting slot 151 of the corresponding rack 15. Each torsion piece 13 is interposed between the base seat 11 and the corresponding rotating plate 125. The rotating portion (125a) of the rotating plate 125 is frictionally engaged with the torsion piece 13 to generate a frictional torque to provide a torque for rotating the rotating plate 125 and to position the rotating plate 125 at an angular position relative to the base seat 11 (see FIG. 11). The two racks 15 extend in the left-right direction (D2), and respectively have the connecting slots 151 which extend in an up-down direction (D3) for movably connecting with the rotating plates 125. The racks 15 mesh with the pinion 14 at two opposite sides of the pinion 14 so as to make synchronous and opposite movements in the left-right direction (D2) between the lateral sides 113.

In a various embodiment, each support unit 12 has one first support piece 121, one second support piece 122, the moving axle 123 and the connecting shaft 124. The first support piece 121, the second support piece 122, the moving axle 123 and the connecting shaft 124 are disposed adjacent to the first end 111 or the second end 112 of the base seat 11.

Similarly, the base seat 11 in the various embodiments has two of the moving slots 114 for movably receiving the moving axles 123.

With reference to FIGS. 3, 5, 7 and 8, the bracket plate unit 2 includes two first bracket plates 21 and two second bracket plates 22. The first bracket plates 21 are interposed between the second bracket plates 22 in the left-right direction (D2). Each first bracket plate 21 is securely connected with the first support portion (121a) of the first support piece 121, and has a first plate surface 212 for attachment of the flexible display 30, and an underside surface 213 opposite to the first plate surface 212 and facing the base seat 11. Each second bracket plate 22 is securely connected with the second support portion (122a) of the second support piece 122, and has a second plate surface 222 for attachment of the flexible display 30, and an underside surface 223 opposite to the second plate surface 222 and facing the base seat 11. The flat plate portion (125b) of the rotating plate 125 is securely connected with the corresponding second bracket plate 22. Each first bracket plate 21 has two first bracket blocks 211 which are formed on the underside surface 213 and spaced apart from each other in the front-rear direction (D1), and which extend toward the other one of the first bracket plates 21. Each second bracket plate 22 has four second bracket blocks 221 which are formed on the underside surface 223 and spaced apart from one another in the front-rear direction (D1) and which extend toward an adjacent one of the first bracket plates 21. The first bracket blocks 211 of the two first bracket plates 21 are arranged alternately in the front-rear direction (D1). The second bracket blocks 221 of the two second bracket plates 22 are arranged alternately in the front-rear direction (D1). The first bracket blocks 211 of one first bracket plate 21 are disposed to support the other first bracket plate 21. The second bracket blocks 221 are disposed to support the adjacent first bracket plates 21.

Figure 12:
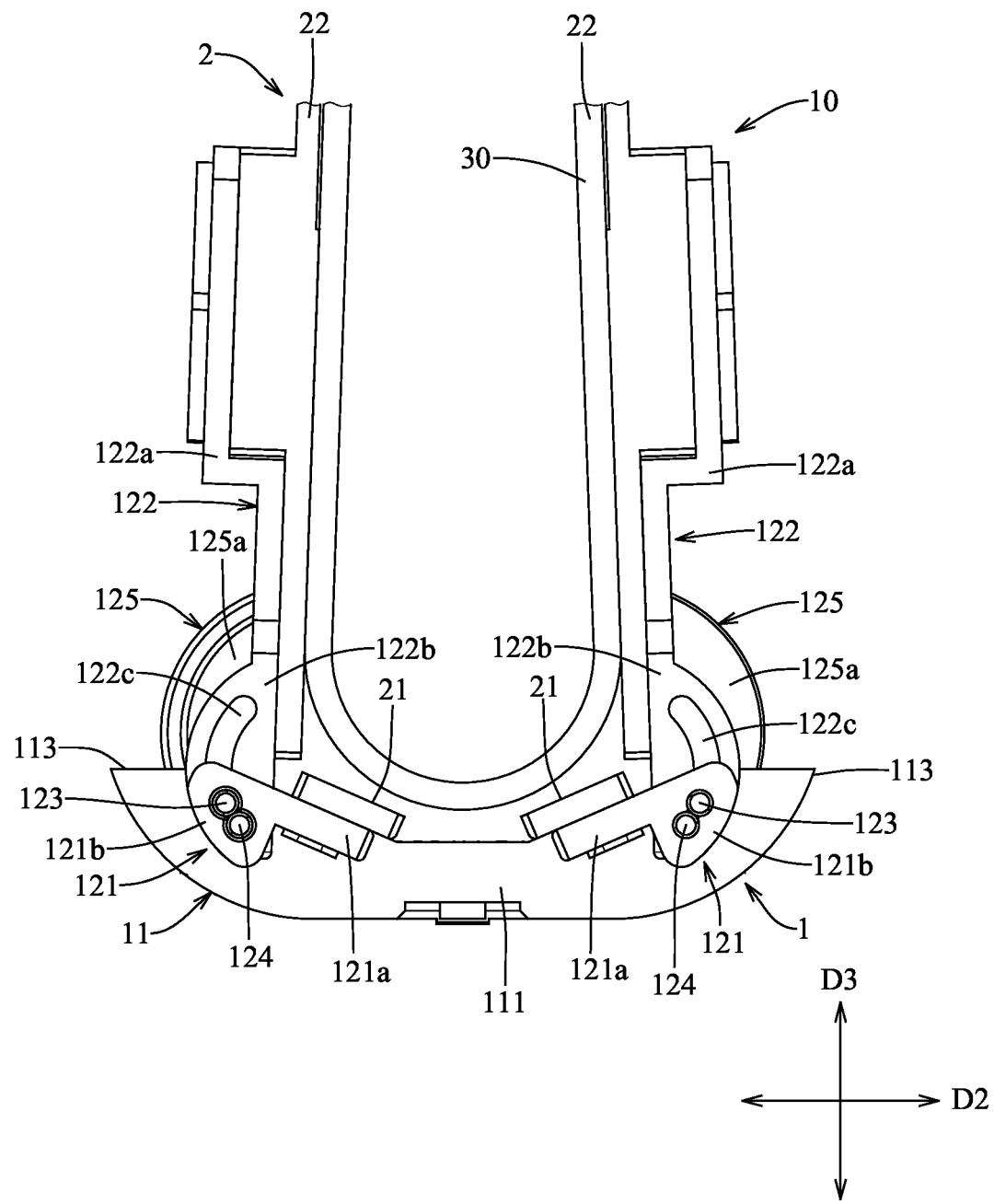
FIG. 12 is a fragmentary front view of the embodiment, illustrating the support units and the bracket plate unit in a terminal position.
Figure 13:
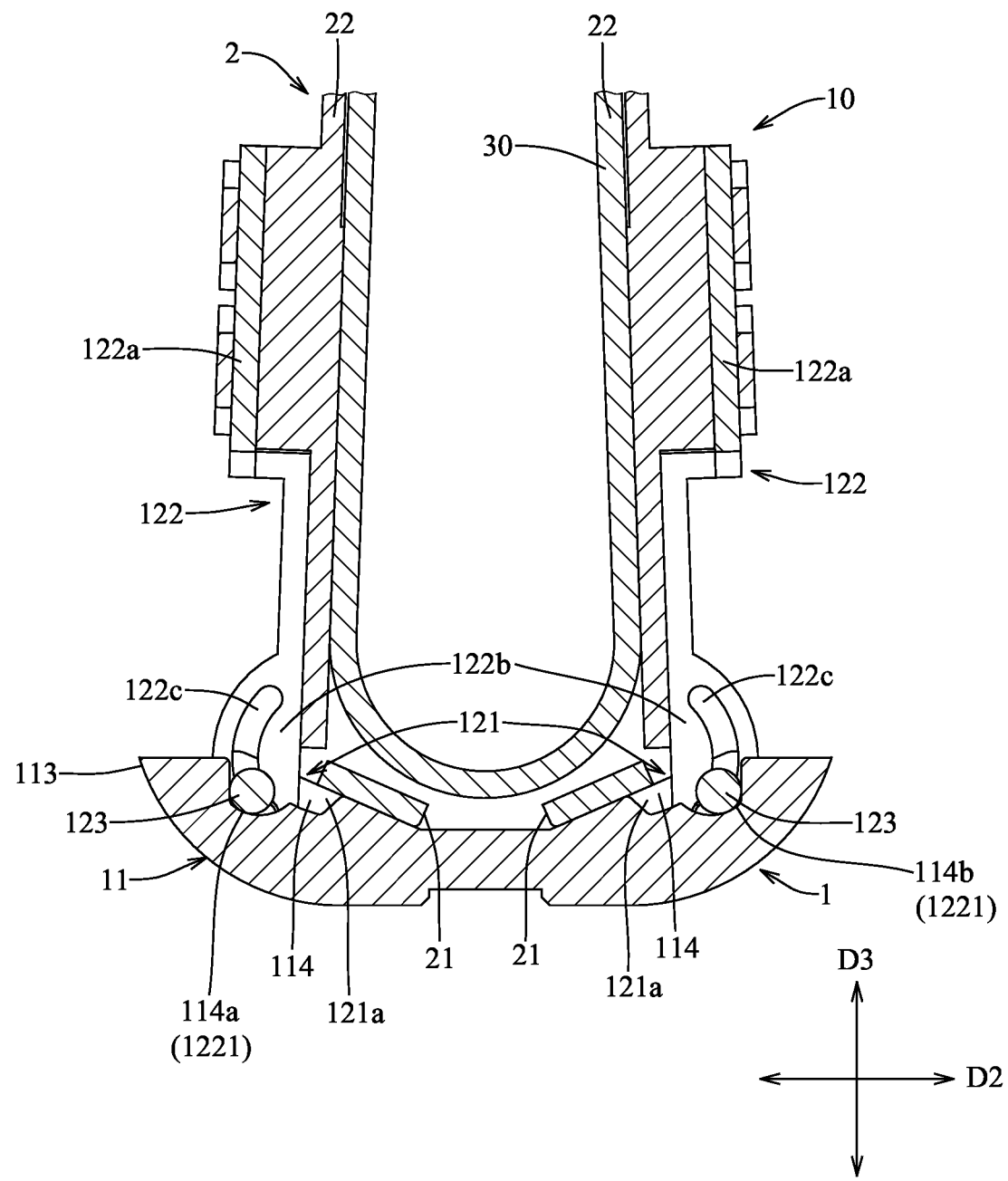
FIG. 13 is a fragmentary sectional view similar to FIG. 10, illustrating the support units and the bracket plate unit in the terminal position.
Figure 14:
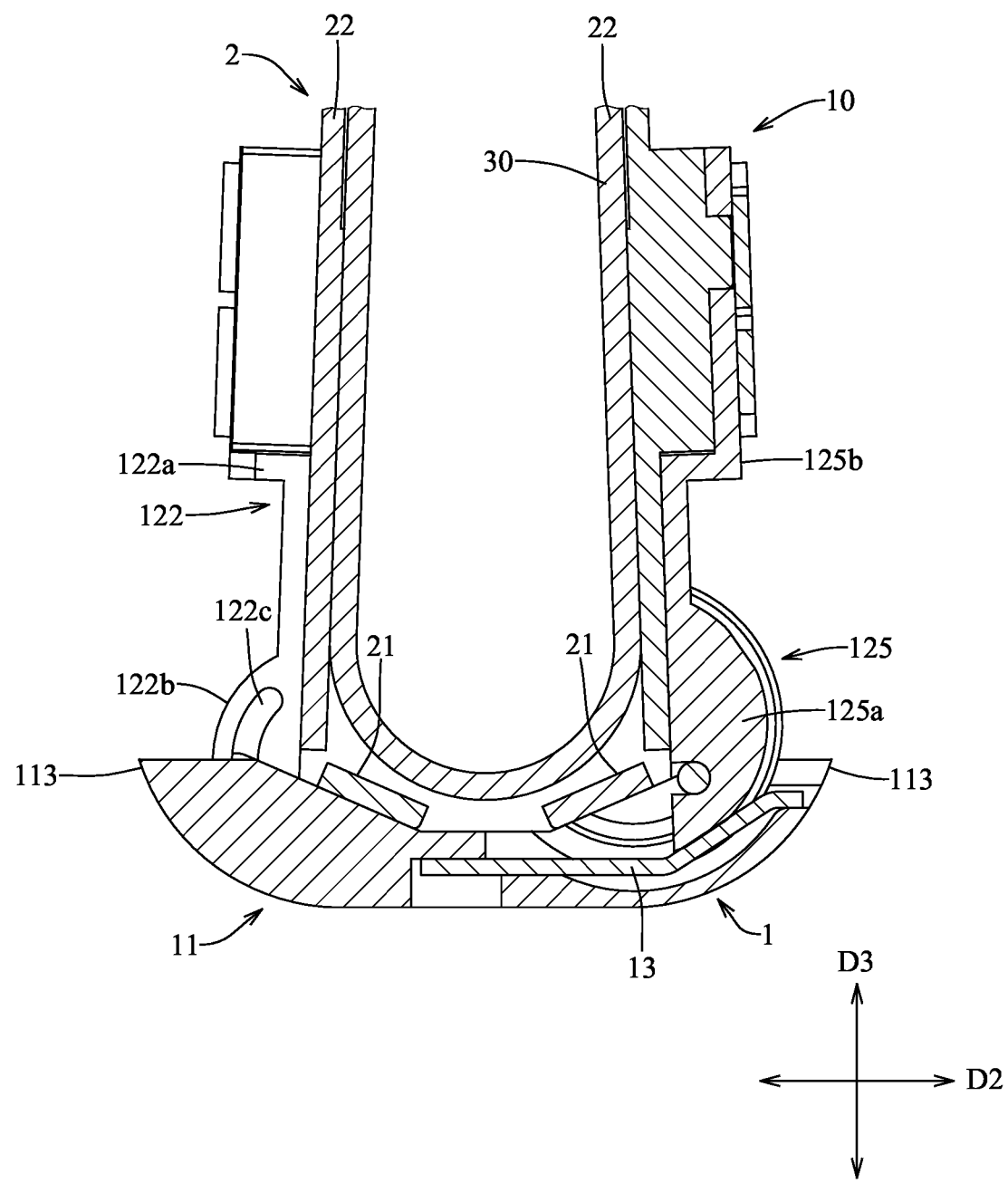
FIG. 14 is a fragmentary sectional view similar to FIG. 11, illustrating the support units and the bracket plate unit in the terminal position.
Figure 15:
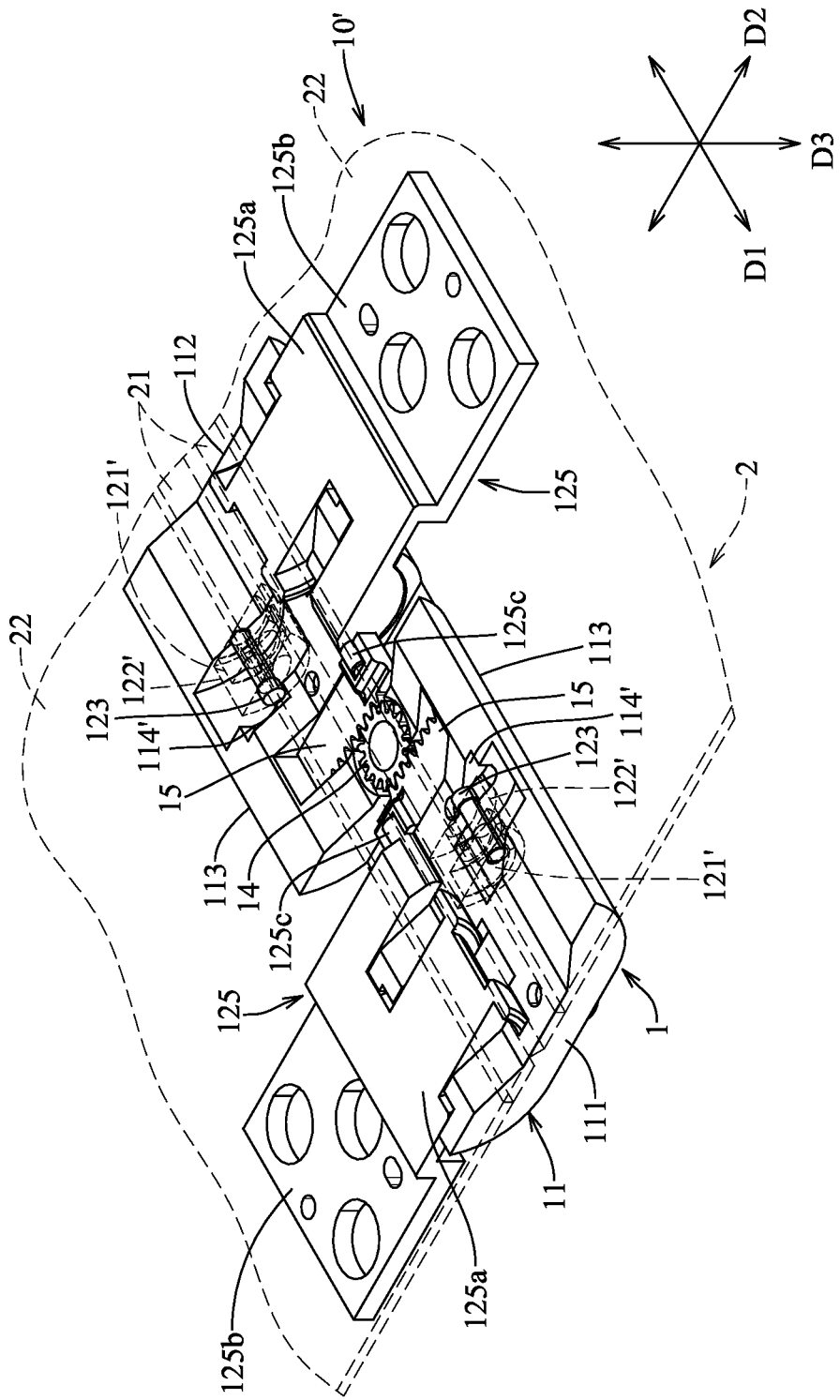
FIG. 15 is a fragmentary perspective view of another embodiment of the synchronizing hinge according to the disclosure.
Figure 16:
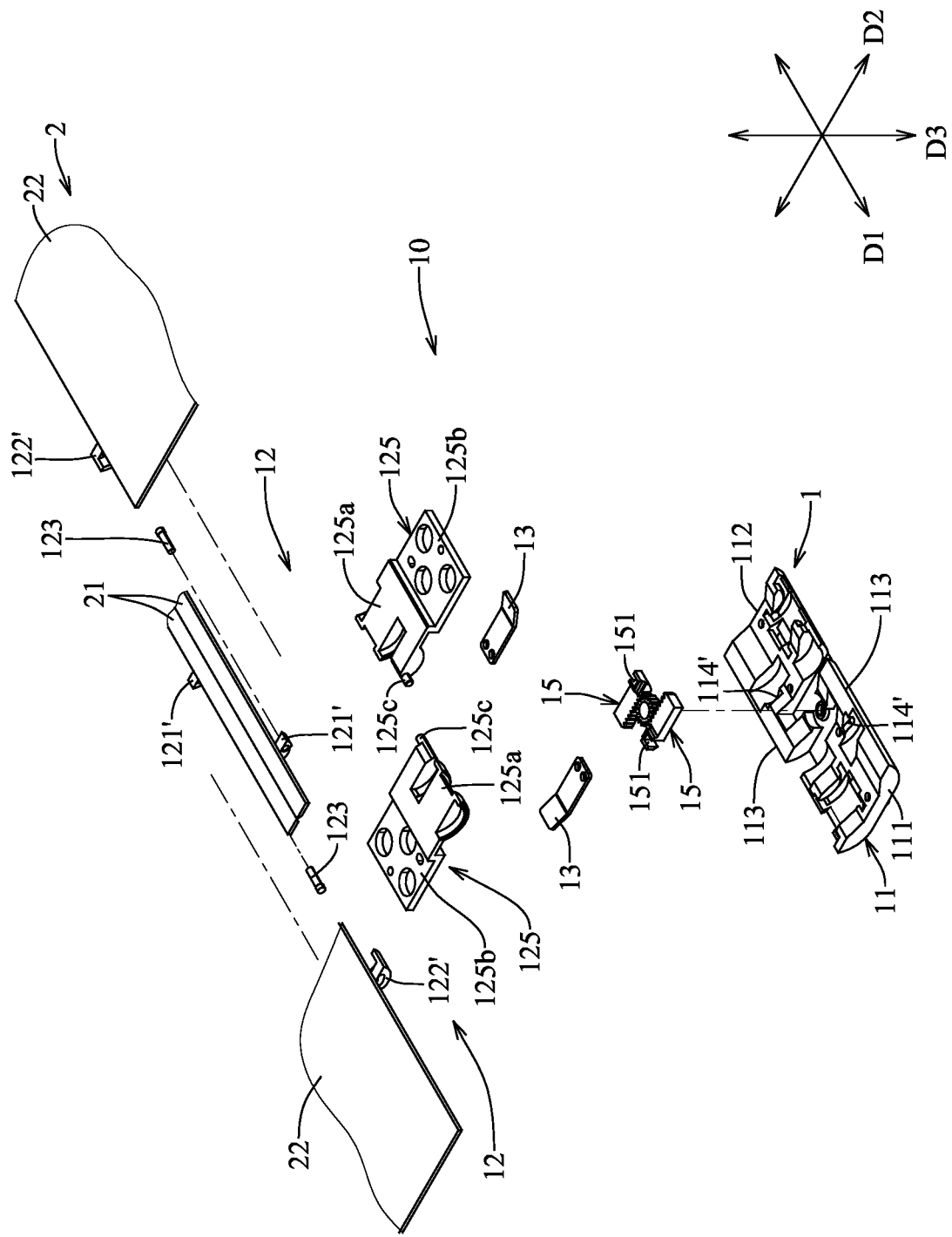
FIG. 16 is a fragmentary, exploded perspective view of the embodiment.
Figure 17:
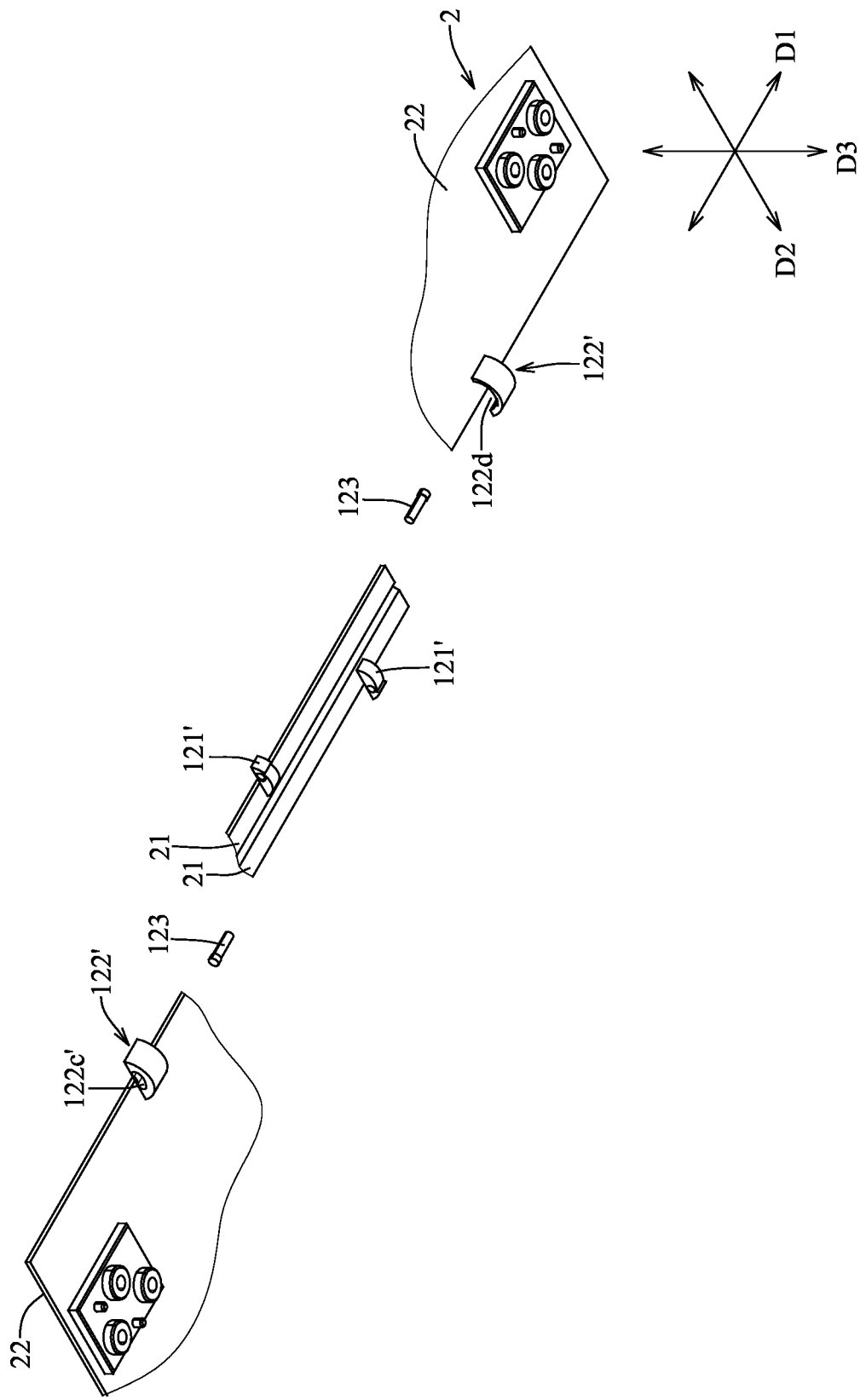
FIG. 17 is a fragmentary, exploded perspective view of a portion of the embodiment.
Figure 18:
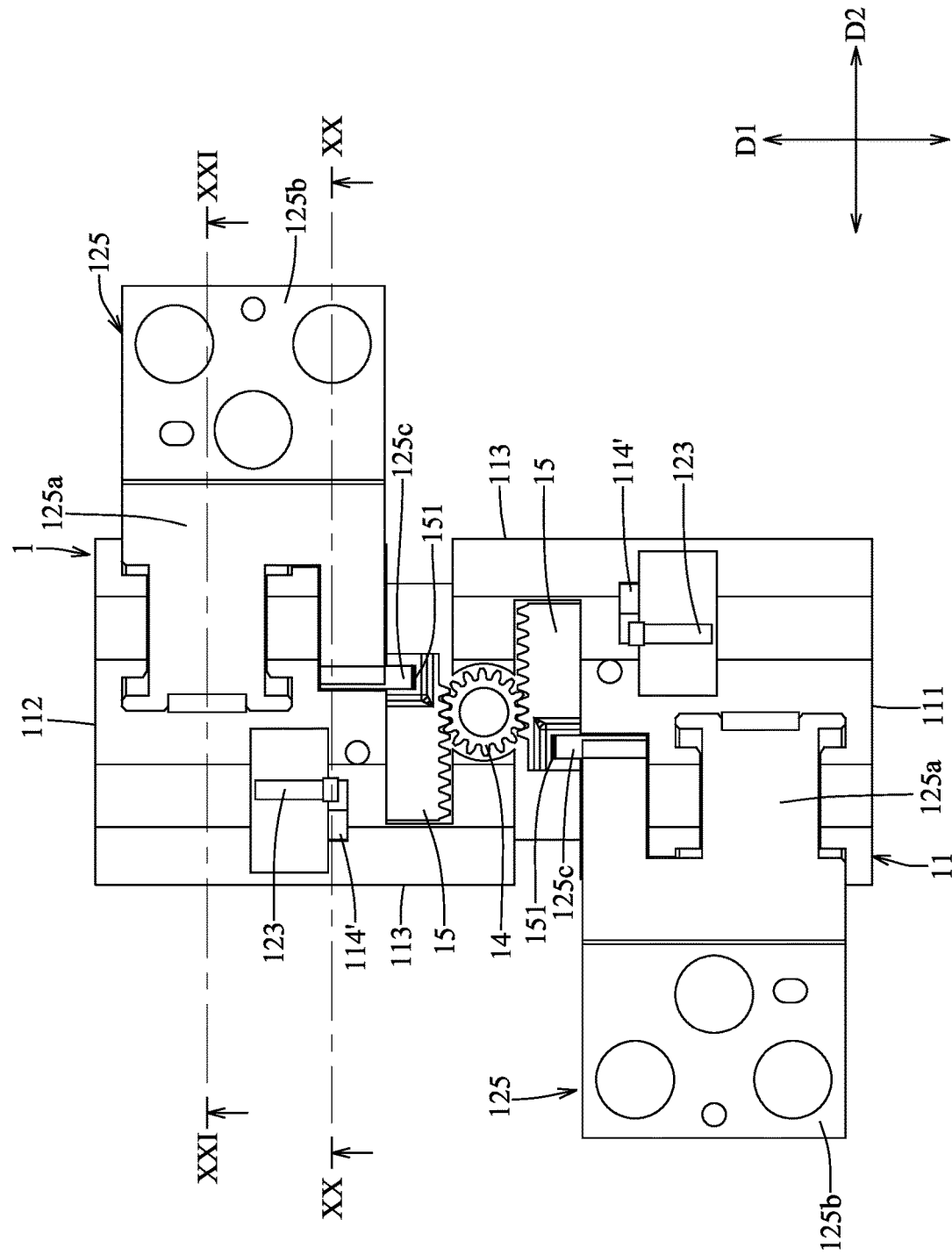
FIG. 18 is a top view of a rotating module of the embodiment.

With reference to FIGS. 7 to 11, with the rotating plates 125 movably connected with the racks 15, and the racks 15 meshing with the pinion 14, the support units 12 and the bracket plate unit 2 are synchronously rotatable such that the housing bodies 20 which are connected at two sides of the synchronizing hinge 10 (see FIG. 3) are moved in a synchronizing and symmetric manner. Specifically, the support units 12 and the bracket plate unit 2 are rotatable between an initial position and a terminal position to shift the two housing bodies 20 between a spread out state (see FIG. 1) corresponding to the initial position to spread the flexible display 30, and a folded state (see FIG. 2) corresponding to the terminal position to fold in the flexible display 30. In the initial position, the moving axles 123 are disposed at the moving proximal ends (114a) of the moving slots 114 and the arcuate distal ends 1222 of the arcuate slots (122c), and the first plate surfaces 212 of the first bracket plates 21 are flush with the second plate surfaces 222 of the second bracket plates 22 so as to keep the flexible display 30 in a flat state. When it is desired to fold the housing bodies 20, the support units 12 and the bracket plate unit 2 are synchronously rotated toward the terminal position. During this operation, the first bracket plates 21 are moved to abut against the base seat 11. The moving axles 123 are then moved toward the moving distal ends (114b) of the moving slots 114 while the second support pieces 122 are rotated upwardly about the moving axles 123 and the arcuate slots (122c) are also rotated upwardly relative to the moving axles 123 such that the moving axles 123 are moved to the arcuate proximate ends 1221 of the arcuate slots (122c). Subsequently with reference to FIGS. 12 to 14, in the terminal position, the moving axles 123 are disposed at the moving distal ends (114b) of the moving slots 114 and the arcuate proximal ends 1221 of the arcuate slots (122c), and the first bracket plates 21 abut against the base seat 11 and are rotated to be respectively inclined relative to the second bracket plates 22 by an inclined angle. The moving axles 123 are separated from each other by a distance in the terminal position, which is larger than that in the initial position. With the first bracket plates 21 inclined relative to the second bracket plates 22 by an inclined angle, a leeway space is produced therebetween for accommodating a bending portion of the flexible display 30 so as to not interfere with the base seat 11. With the first support pieces 121 securely connected with the first bracket plates 21 and rotated with the moving axles 123 and the second support pieces 122, the first bracket plates 21 are moved along with the first support pieces 121 while restrained by the first support pieces 121 so as to prevent excess angular movement of the first bracket plates 21 relative to the second bracket plates 22 to avoid bulging up of the flexible display 30.

With reference to FIGS. 15 to 18, in another embodiment of the synchronizing hinge 10', the base seat 11 has two of the moving slots 114' which are disposed opposite to each other in both the front-rear direction (D1) and the left-right direction (D2). Each support unit 12 includes a first support piece 121', a second support piece 122', a moving axle 123 and a rotating plate 125. In contrast to the first embodiment, a connecting shaft of each support unit 12 is dispensed with. Also, first and second bracket blocks of the bracket plate unit 2 are dispensed with. The first support piece 121' of each support unit 12 has an arcuate profile. The second support piece 122' of each support unit 12 has an arcuate profile, and is formed with an arcuate slot (122c') and a pivoting slot (122d) which receives the corresponding first support piece 121' and which is in communication with the arcuate slot (122c'). In this embodiment, the first support piece 121' is integrally formed with the respective first bracket plate 21, is disposed under the first bracket plate 21, and extends toward the adjacent second bracket plate 22 so as to support the second bracket plate 22. Also, the second support piece 122' is integrally formed with the respective second bracket plate 22, is disposed under the second bracket plate 22, and extends toward the adjacent first bracket plate 21 so as to support the first bracket plate 21.

Figure 19:
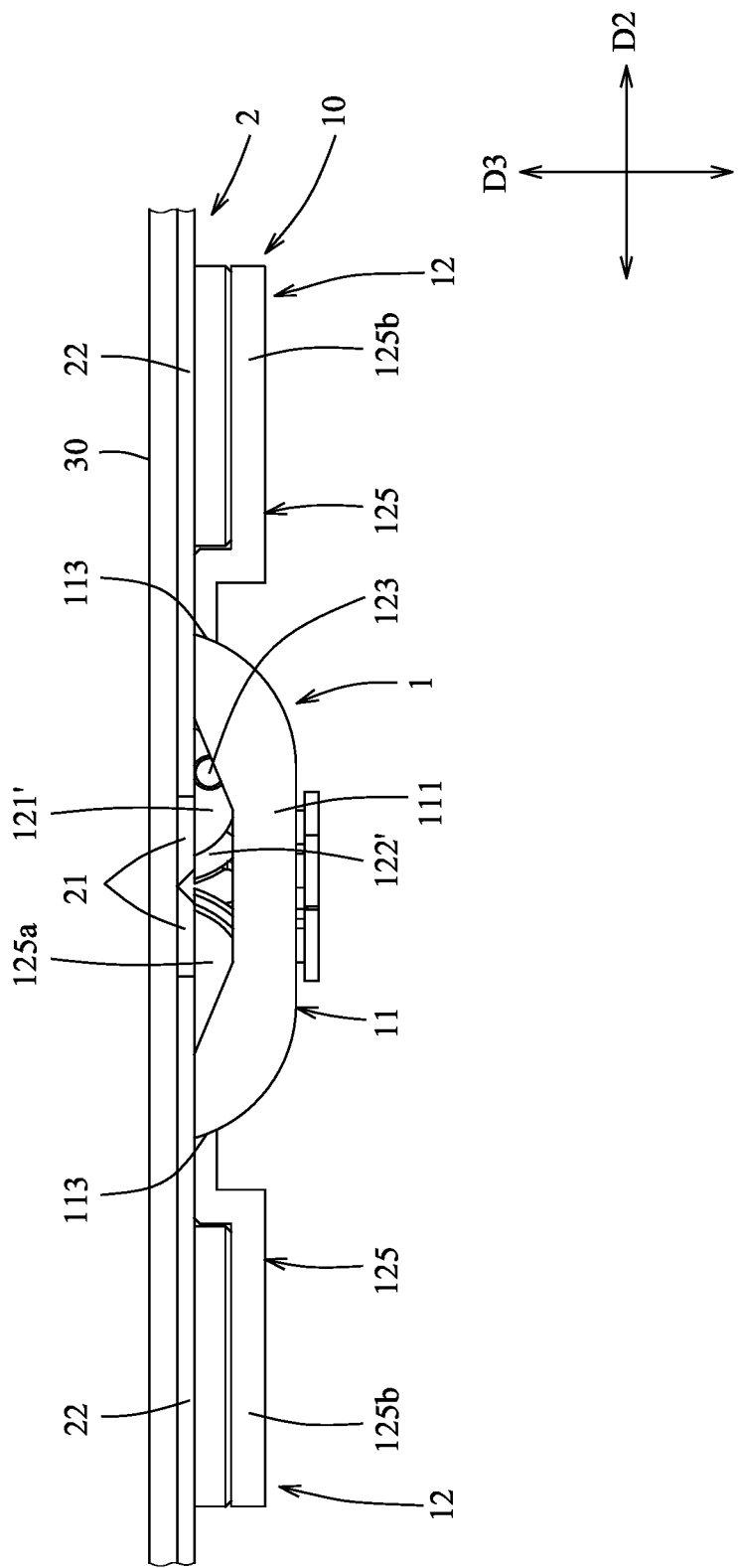
FIG. 19 is a fragmentary front view of the embodiment, illustrating two support units of the rotating module and a bracket plate unit in an initial position.
Figure 20:
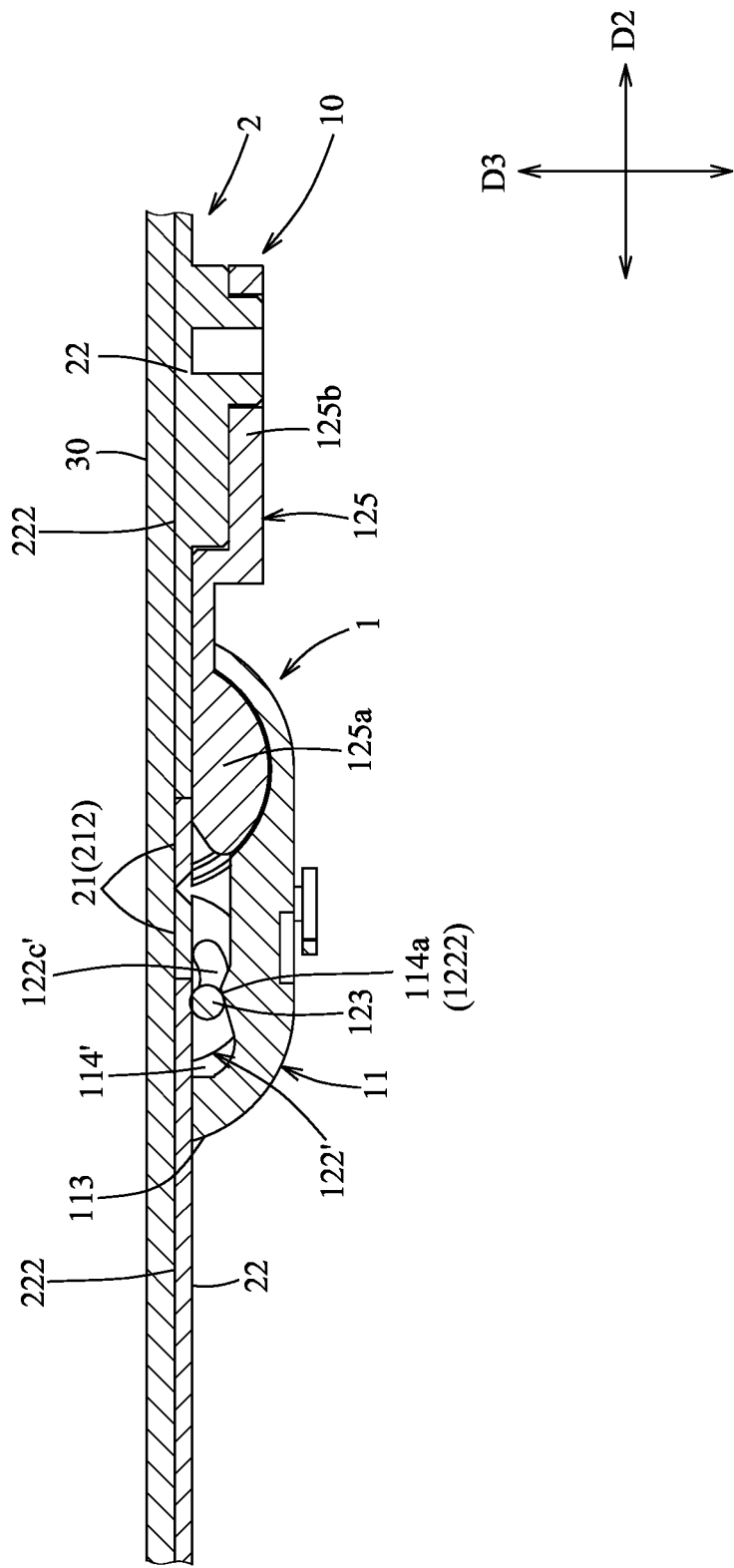
FIG. 20 is a fragmentary sectional view taken along line XX-XX of FIG. 18.
Figure 21:
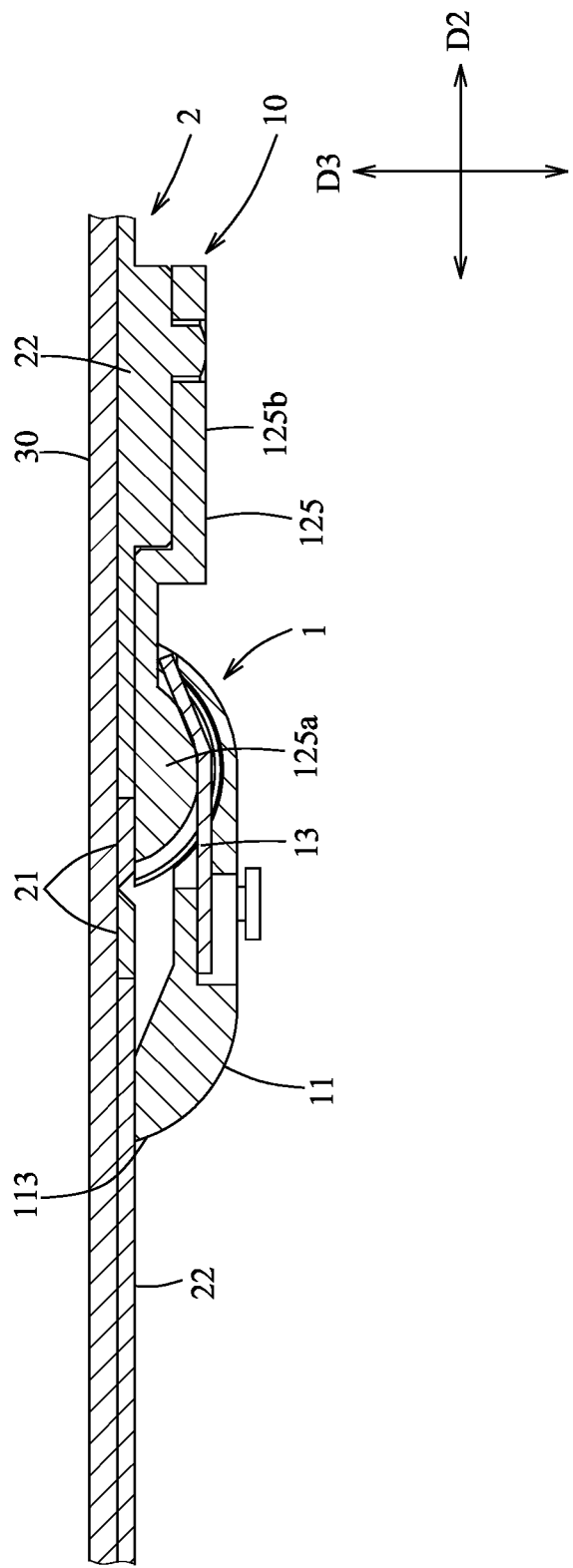
FIG. 21 is a fragmentary sectional view taken along line XXI-XXI of FIG. 18.
Figure 22:
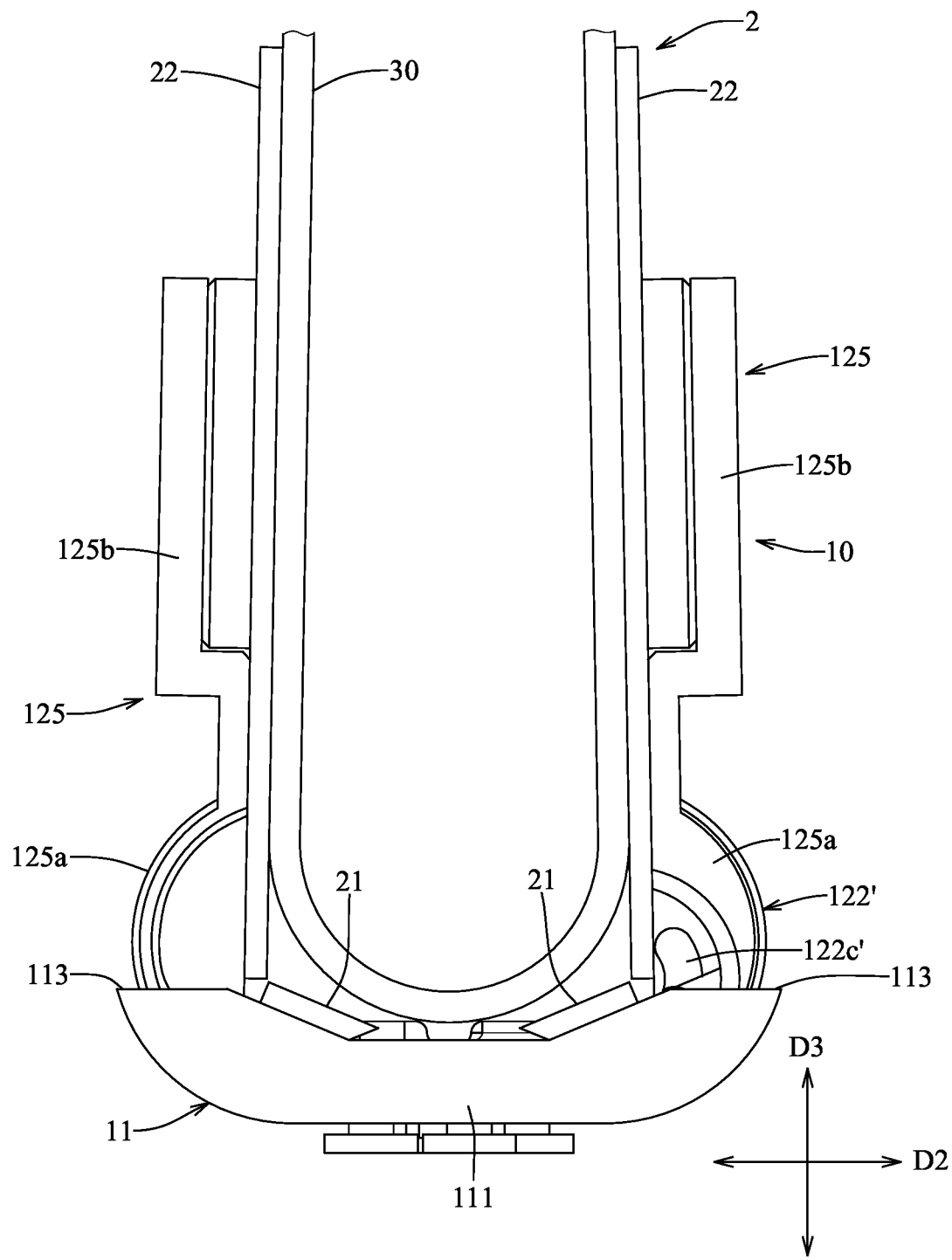
FIG. 22 is a fragmentary front view of the embodiment, illustrating the support units and the bracket plate unit in a terminal position.
Figure 23:
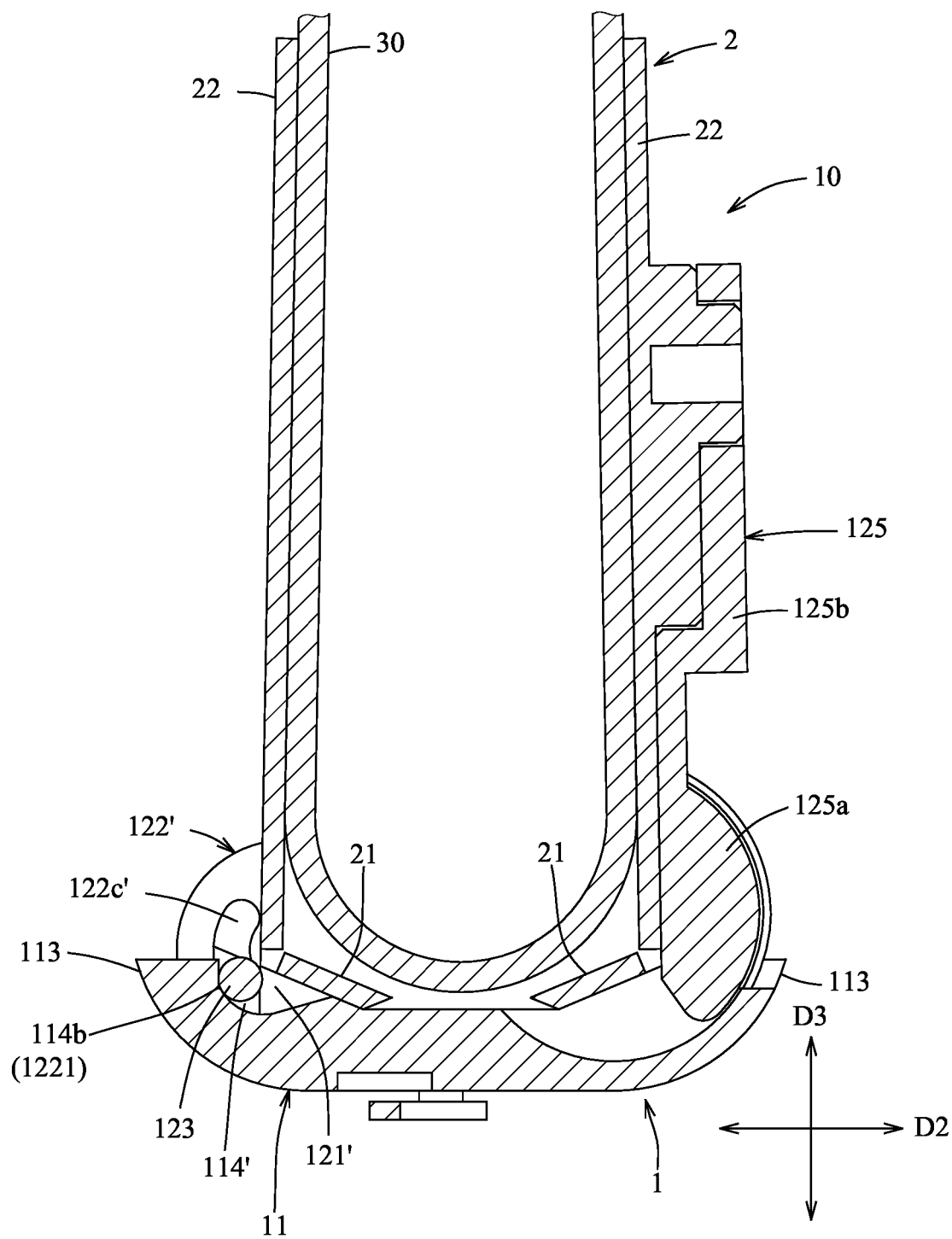
FIG. 23 is a fragmentary sectional view similar to FIG. 20, illustrating the support units and the bracket plate unit in the terminal position.
Figure 24:
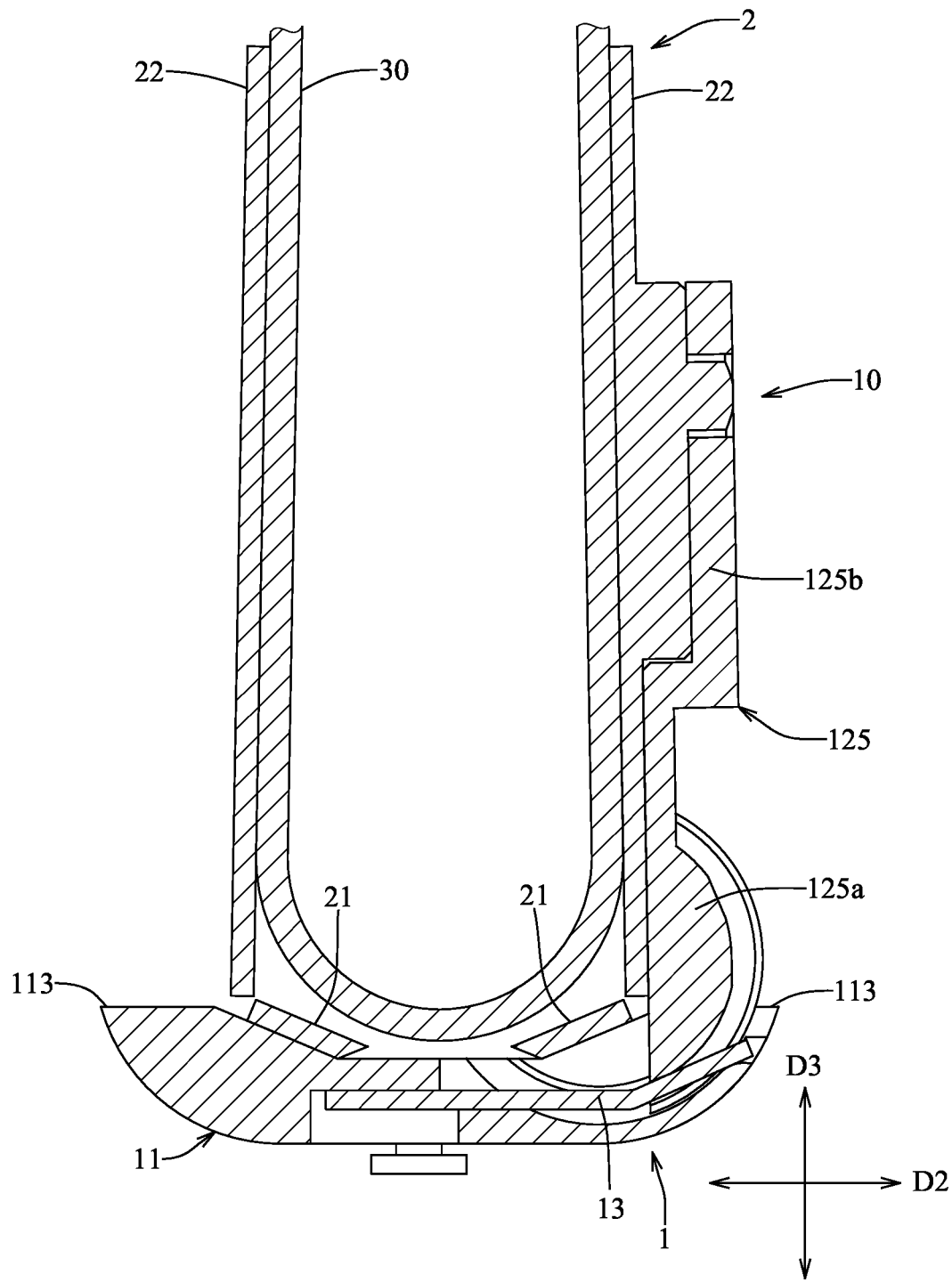
FIG. 24 is a fragmentary sectional view similar to FIG. 21, illustrating the support units and the bracket plate unit in the terminal position.

With reference to FIGS. 19 to 21, the support units 12 and the bracket plate unit 2 are rotatable between the initial position and the terminal position to shift the housing bodies 20 between a spread out state corresponding to the initial position to spread the flexible display 30, and a folded state corresponding to the terminal position to fold in the flexible display 30. In the initial position, the moving axles 123 are disposed at the moving proximal ends (114a) of the moving slots 114' and the arcuate distal ends 1222 of the arcuate slots (122c'), and the first plate surfaces 212 of the first bracket plates 21 are flush with the second plate surfaces 222 of the second bracket plates 22 so as to keep the flexible display 30 in a flat state. When it is desired to fold the housing bodies 20, the support units 12 and the bracket plate unit 2 are synchronously rotated toward the terminal position. During this operation, the first bracket plates 21 are moved to abut against the base seat 11. The moving axles 123 are then moved toward the moving distal ends (114b) of the moving slots 114' while the second support pieces 122' are rotated upwardly about the moving axles 123 and the arcuate slots (122c') are also rotated upwardly relative to the moving axles 123 such that the moving axles 123 are moved to the arcuate proximate ends 1221 of the arcuate slots (122c'). Subsequently with reference to FIGS. 22 to 24, in the terminal position, the moving axles 123 are disposed at the moving distal ends (114*b*) of the moving slots 114' and the arcuate proximal ends 1221 of the arcuate slots (122*c*), and the first bracket plates 21 abut against the base seat 11 and are rotated to be respectively inclined relative to the second bracket plates 22 by an inclined angle.

As illustrated, with the first bracket plates 21 inclined relative to the second bracket plates 22 by an inclined angle, a leeway space is produced therebetween for accommodating a bending portion of the flexible display 30 so as to not interfere with the base seat 11. Also, with the first support pieces 121, 121' securely connected with the first bracket plates 21 and rotated with the moving axles 123 and the second support pieces 122, 122', the first bracket plates 21 are moved along with the first support pieces 121, 121' while restrained by the first support pieces 121, 121' so as to prevent excess angular movement of the first bracket plates 21 relative to the second bracket plates 22 to avoid bulging up of the flexible display 30. With such structure of the rotating module 1 and the bracket plate unit 2, the synchronizing hinge has a reduced thickness which makes it more compact in the folded state, and provides a support to the flexible display 30 in the spread out state for facilitating usage of the flexible display 30.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A synchronizing hinge adapted to be disposed between two housing bodies of a foldable electronic device to support a flexible display, comprising:
    at least one rotating module including a base seat and two support units which are pivotably mounted to said base seat, said base seat having two moving slots each of which has a moving proximal end and a moving distal end, each of said support units having a first support piece, a second support piece which is pivotably connected with said first support piece, and a moving axle which extends through said first support piece and said second support piece and which is movably received in a respective one of said moving slots, said second support piece having an arcuate slot which has an arcuate proximal end and an arcuate distal end, said moving axle extending through said arcuate slot; and
    a bracket plate unit including two first bracket plates and two second bracket plates, each of said first bracket plates being securely connected with said first support piece of a respective one of said support units and having a first plate surface for attachment of the flexible display, said first bracket plates being interposed between said second bracket plates, each of said second bracket plates being securely connected with said second support piece of the respective one of said support units and having a second plate surface for attachment of the flexible display,
    wherein said support units and said bracket plate unit are rotatable between an initial position and a terminal position to shift the two housing bodies between a spread out state corresponding to the initial position to spread out the flexible display and a folded state corresponding to the terminal position to fold in the flexible display,
    wherein, in the initial position, said moving axles are disposed at said moving proximal ends of said moving slots and said arcuate distal ends of said arcuate slots, and said first plate surfaces of said first bracket plates are flush with said second plate surfaces of said second bracket plates so as to keep the flexible display in a flat state,
    wherein, in the terminal position, said moving axles are disposed at said moving distal ends of said moving slots and said arcuate proximal ends of said arcuate slots, and said first bracket plates abut against said base seat and are rotated to be respectively inclined relative to said second bracket plates by an inclined angle, and
    wherein said moving axles are separated from each other by a distance when said support units and said bracket plate unit are in the terminal position, which is larger than that when said support units and said bracket plate unit are in the initial position.

2. The synchronizing hinge of claim 1, wherein each of said support units has a rotating plate which is rotatably disposed on said base seat and which is securely connected with a respective one of said second bracket plates, said rotating module further including two torsion pieces each of which is interposed between said base seat and said rotating plate, said rotating plate being frictionally engaged with a respective one of said torsion pieces to generate a frictional torque to position said rotating plate at an angular position relative to said base seat.

3. The synchronizing hinge of claim 2, wherein said base seat has a first end, a second end opposite to said first end in a front-rear direction, and two lateral sides interconnecting said first and second ends and being opposite to each other in a left-right direction, said rotating module further including a pinion which is rotatably disposed on said base seat, and two racks which are movably disposed on said base seat and which are respectively connected with said rotating plates of said support units, said racks meshing with said pinion at two opposite sides of said pinion so as to make synchronous and opposite movements in the left-right direction between said lateral sides.

4. The synchronizing hinge of claim 3, wherein said rotating plate of each of said support units has a rotating portion which is rotatably disposed on said base seat, a flat plate portion which extends from said rotating portion in the left-right direction and which is securely connected with the respective one of said second bracket plates, and a stud which is formed on said rotating portion, each of said racks having a connecting slot in which said stud is movable engaged.

5. The synchronizing hinge of claim 1, wherein said base seat has a first end, a second end opposite to said first end in a front-rear direction, and two lateral sides interconnecting said first and second ends and being opposite to each other in a left-right direction, said first support piece of each of said support units having a first support portion which is securely connected with a respective one of said first bracket plates, and a first pivoting portion which extends from said first support portion toward a respective one of said lateral sides, said second support piece of each of said support units having a second support portion which is securely connected with a respective one of said second bracket plates, and a second pivoting portion which extends from said second pivoting portion and which is disposed at a side of said first pivoting portion, said arcuate slot being formed in said second pivoting portion, each of said support units having a connecting shaft which extends in the front-rear direction through said first pivoting portion and said arcuate slot, said moving axle extending through said first pivoting portion and said arcuate slot, and being inserted into the respective one of said moving slots.

6. The synchronizing hinge of claim 1, wherein said first support piece of each of said support units has an arcuate profile, and said second support piece of each of said support units has an arcuate profile and is formed with a pivoting slot which receives said first support piece and which is in communication with said arcuate slot.

7. The synchronizing hinge of claim 1, wherein each of said first bracket plates has a plurality of first bracket blocks which are formed on a surface thereof opposite to said first plate surface and which extend toward the other one of said first bracket plates, and each of said second bracket plates has a plurality of second bracket blocks which are formed on a surface thereof opposite to said second plate surface and which extend toward an adjacent one of said first bracket plates.

\* \* \* \* \*